United States Patent
Murata et al.

(10) Patent No.: US 7,339,998 B2
(45) Date of Patent: Mar. 4, 2008

(54) METHOD OF SELECTING TRANSPORT FORMAT COMBINATION, AND MOBILE TERMINAL APPARATUS

(75) Inventors: Shyuichi Murata, Kawasaki (JP); Masatsugu Shimizu, Kawasaki (JP)

(73) Assignees: Fujitsu Limited, Kawasaki (JP); NTT DoCoMo, Inc., Tokyo (JP)

( * ) Notice: Subject to any disclaimer, the term of this patent is extended or adjusted under 35 U.S.C. 154(b) by 821 days.

(21) Appl. No.: 10/281,566

(22) Filed: Oct. 28, 2002

(65) Prior Publication Data
US 2003/0193913 A1 Oct. 16, 2003

(30) Foreign Application Priority Data
Apr. 10, 2002 (JP) ............................. 2002-107645

(51) Int. Cl.
*H04K 1/10* (2006.01)
(52) U.S. Cl. ...................................... 375/260; 375/140
(58) Field of Classification Search ................ 375/260, 375/146
See application file for complete search history.

(56) References Cited

U.S. PATENT DOCUMENTS 6,747,958 B2* 6/2004 Vayanos et al. ............. 370/252
6,823,194 B2* 11/2004 Haim .......................... 455/522
6,907,009 B2* 6/2005 Maruwaka et al. .......... 370/252
2003/0036403 A1* 2/2003 Shiu et al. ................... 455/522

FOREIGN PATENT DOCUMENTS

WO    WO 01/41332    6/2001

OTHER PUBLICATIONS

Notification of Reasons for Refusal dated Jan. 23, 2007.

\* cited by examiner

*Primary Examiner*—Mohammed Ghayour
*Assistant Examiner*—Juan Alberto Torres
(74) *Attorney, Agent, or Firm*—Katten Muchin Rosenman LLP

(57) ABSTRACT

Disclosed is a transport format combination (TFC) selection method in a mobile terminal apparatus for selecting a TFC that stipulates a combination of transport data bit lengths of prescribed transmission time intervals of transport channels, multiplexing transport data of each of the transport channels based upon the TFC that has been selected, and transmitting this data. A class changeover unit classifies each TFC based upon amount of multiplexed transport data of each transport channel, decides the class of a TFC to be selected, based upon a transmission power value, and selects a TFC from the class decided. When the TFC class is decided, a transmission power monitor measures a transmission power value and the class changeover unit raises or lowers the class of the TFC to be selected, based upon the size relationship between a designated maximum transmission power value and the measured transmission power value.

19 Claims, 22 Drawing Sheets

| No TFCj | TrCH1 FORMAT (bits) | TrCH2 FORMAT (bits) | DATA LENGTH AFTER RATE MATCHING (bits) | TRANSPORT-SLOT FORMAT NO. |
|---|---|---|---|---|
| 1 | 336bits×0 | 148×0 | 0 | |
| 2 | 336bits×0 | 148×1 | 600 | 2 |
| 3 | 336bits×1 | 148×0 | 600 | 2 |
| 4 | 336bits×1 | 148×1 | 1200 | 3 |
| 5 | 336bits×2 | 148×0 | 1200 | 3 |
| 6 | 336bits×2 | 148×1 | 1200 | 3 |
| 7 | 336bits×4 | 148×0 | 1200 | 3 |
| 8 | 336bits×4 | 148×1 | 2400 | 4 |
| 9 | 336bits×8 | 148×0 | 2400 | 4 |
| 10 | 336bits×8 | 148×1 | 4800 | 5 |
| 11 | 336bits×12 | 148×0 | 4800 | 5 |
| 12 | 336bits×12 | 148×1 | 4800 | 5 |
| 13 | 336bits×16 | 148×0 | 9600 | 6 |
| 14 | 336bits×16 | 148×1 | 9600 | 6 |
| 15 | 336bits×20 | 148×0 | 9600 | 6 |
| 16 | 336bits×20 | 148×1 | 9600 | 6 |
| 17 | 336bits×24 | 148×0 | 9600 | 6 |
| 18 | 336bits×24 | 148×1 | 9600 | 6 |

| TRANSPORT-SLOT FORMAT NO. | BIT LENGTH PER FRAME (bits) |
|---|---|
| 0 | 150 |
| 1 | 300 |
| 2 | 600 |
| 3 | 1200 |
| 4 | 2400 |
| 5 | 4800 |
| 6 | 9600 |

FIG. 10B

|  | MAXIMUM | MINIMUM |
|---|---|---|
| LARGEST CLASS 0 | 590560 | 590560/2=295280 |
| NEXT LARGEST CLASS 1 | 295280 | 295280/2=147640 |
| NEXT LARGEST CLASS 2 | 147640 | 147640/2=73820 |
| NEXT LARGEST CLASS 3 | 73820 | 73820/2=36910 |
| NEXT LARGEST CLASS 4 | 36910 | 36910/2=18455 |
| NEXT LARGEST CLASS 5 | 18455 | 18455/2=9227.5 |
| NEXT LARGEST CLASS 6 | 9227.5 | 0 |

FIG. 11

| No. | TrCH 1 FORMAT (bits) | TrCH 2 FORMAT (bits) | N(bits) | CLASSIFICATION |
|---|---|---|---|---|
| 1 | 336bit×0 | 148×0 | 0 | 6 |
| 2 | 336bit×0 | 148×1 | 5920 | 6 |
| 3 | 336bit×1 | 148×0 | 24360 | 4 |
| 4 | 336bit×1 | 148×1 | 30280 | 4 |
| 5 | 336bit×2 | 148×0 | 48720 | 3 |
| 6 | 336bit×2 | 148×1 | 54640 | 3 |
| 7 | 336bit×4 | 148×0 | 97440 | 2 |
| 8 | 336bit×4 | 148×1 | 103360 | 2 |
| 9 | 336bit×8 | 148×0 | 194880 | 1 |
| 10 | 336bit×8 | 148×1 | 200800 | 1 |
| 11 | 336bit×12 | 148×0 | 292320 | 1 |
| 12 | 336bit×12 | 148×1 | 298240 | 0 |
| 13 | 336bit×16 | 148×0 | 389760 | 0 |
| 14 | 336bit×16 | 148×1 | 395680 | 0 |
| 15 | 336bit×20 | 148×0 | 487200 | 0 |
| 16 | 336bit×20 | 148×1 | 493120 | 0 |
| 17 | 336bit×24 | 148×0 | 584640 | 0 |
| 18 | 336bit×24 | 148×1 | 590560 | 0 |

FIG. 12

| No. | TrCH 1 FORMAT (bits) | TrCH 2 FORMAT (bits) | DATA LENGTH AFTER RATE MATCHING | TRANSPORT-SLOT FORMAT NO. | N(bits) | CLASSIFICATION BY SIMPLE CALCULATION |
|---|---|---|---|---|---|---|
| 1 | 336bit×0 | 148×0 | 0 | – | 0 | 6 |
| 2 | 336bit×0 | 148×1 | 600 | 2 | 5920 | 6 |
| 3 | 336bit×1 | 148×0 | 600 | 2 | 24360 | 4 |
| 4 | 336bit×1 | 148×1 | 1200 | 3 | 30280 | 4 |
| 5 | 336bit×2 | 148×0 | 1200 | 3 | 48720 | 3 |
| 6 | 336bit×2 | 148×1 | 1200 | 3 | 54640 | 3 |
| 7 | 336bit×4 | 148×0 | 1200 | 3 | 97440 | 2 |
| 8 | 336bit×4 | 148×1 | 2400 | 4 | 103360 | 2 |
| 9 | 336bit×8 | 148×0 | 2400 | 4 | 194880 | 1 |
| 10 | 336bit×8 | 148×1 | 4800 | 5 | 200800 | 1 |
| 11 | 336bit×12 | 148×0 | 4800 | 5 | 292320 | 1 |
| 12 | 336bit×12 | 148×1 | 4800 | 5 | 298240 | 0 |
| 13 | 336bit×16 | 148×0 | 9600 | 6 | 389760 | 0 |
| 14 | 336bit×16 | 148×1 | 9600 | 6 | 395680 | 0 |
| 15 | 336bit×20 | 148×0 | 9600 | 6 | 487200 | 0 |
| 16 | 336bit×20 | 148×1 | 9600 | 6 | 493120 | 0 |
| 17 | 336bit×24 | 148×0 | 9600 | 6 | 584640 | 0 |
| 18 | 336bit×24 | 148×1 | 9600 | 6 | 590560 | 0 |

FIG. 20 PRIOR ART (A) TFI AND NUMBER OF TrBks × NUMBER OF TrBk BITS (TrCH#1)

| TFI | TrBk |
|---|---|
| 0 | 0 × 336 |
| 1 | 1 × 336 |
| 2 | 2 × 336 |
| 3 | 4 × 336 |
| 4 | 8 × 336 |
| 5 | 12 × 336 |

(B) TFI AND NUMBER OF TrBks × NUMBER OF TrBk BITS (TrCH#2)

| TFI | TrBk |
|---|---|
| 0 | 0 × 148 |
| 1 | 1 × 148 |

(C) TFI COMBINATIONS

| TFI OF TrCH#1 | TFI OF TrCH#2 | CTFC |
|---|---|---|
| 0 | 0 | 0 |
| 0 | 1 | 6 |
| 1 | 0 | 1 |
| 1 | 1 | 7 |
| 2 | 0 | 2 |
| 2 | 1 | 8 |
| 3 | 0 | 3 |
| 3 | 1 | 9 |
| 4 | 0 | 4 |
| 4 | 1 | 10 |
| 5 | 0 | 5 |
| 5 | 1 | 11 |

(D) CORRESPONDENCE BETWEEN TFCI AND CTFC

| TFCI | CTFC |
|---|---|
| 0 | 0 |
| 1 | 6 |
| 2 | 1 |
| 3 | 7 |
| 4 | 2 |
| 5 | 8 |
| 6 | 3 |
| 7 | 9 |
| 8 | 4 |
| 9 | 10 |
| 10 | 5 |
| 11 | 11 |

(E) TFI COMPOSITION AND TFCI AT TIME OF TrCH MULTIPLEXING

| FRAME | TFI TrCH#1 | TFI TrCH#2 | TFCI |
|---|---|---|---|
| 1ST FRAME | 2 | 1 | 5 |
| 2ND FRAME | 2 | 1 | 5 |
| 3RD FRAME | 1 | 1 | 3 |
| 4TH FRAME | 1 | 1 | 3 |

METHOD OF SELECTING TRANSPORT FORMAT COMBINATION, AND MOBILE TERMINAL APPARATUS

BACKGROUND OF THE INVENTION

This invention relates to a method of selecting a transport format combination (TFC) and to a mobile terminal apparatus. More particularly, the invention relates to a TFC selection method for performing a TFC selection in such a manner that maximum transmission power of the apparatus will not be exceeded or in such a manner that an appropriate transmission power will be obtained, and to a mobile terminal that employs this method.

FIG. 13 is a block diagram illustrating a CDMA mobile terminal device according to the prior art. User data and control data, sent from a plurality of terminal access function units (abbreviated to "TAF" below) $1a$ to in and a host application 2 upon being mapped to prescribed local channels (abbreviated to "LCH" below), is collected together in a terminal access function interface (abbreviated to "TAF IF" below) 3. The TAF IF 3 has a TFC decision unit $3a$ for checking the state of a connection between an LCH and a transport channel (abbreviated to "TrCH" below) from connection information designated beforehand by a higher layer. If the LCH has been connected to the TrCH, then, in accordance with transport format information (a TFI table) that specifies one or more transport data lengths of prescribed transmission time intervals TTI of the TrCHs designated similarly by the higher layer, the TFC decision unit $3a$ decides a combination TFC of transport formats of TrCHs capable of transmitting as much data as possible. Here TTI, TFI and TFC are the abbreviations of Transmission Time Interval, Transport Format Indicator and Transport Format Combination, respectively.

The TAF IF 3 has a TrCH data demultiplexer $3b$ for recognizing transport data length every transmission time interval TTI of each TrCH based upon the TFC that has been decided, separating the transport data of each TrCH every transmission time interval TTI based upon the transport data length, and inputting the separated data to a channel codec. In the description that follows, it is assumed that the number of TrCHs is four and that the TTIs of respective ones of the TrCHs are 10 ms, 20 ms, 40 ms and 80 ms.

Transmit buffers $5_1$ to $5_4$ of the channel codec write the transport data, which enters from the TAF IF 3, to buffer memories (not shown) continuously and read out the transport data every TTI of 10 ms, 20 ms, 40 ms, 80 ms and input the read data to encoding processors $6_1$ to $6_4$, respectively, which constitute the succeeding stage. The encoding processors $6_1$ to $6_4$ encode the transport data of the TTIs 10, 20, 40 and 80 ms in accordance with convolutional or turbo encoding and input the encoded data to a multiplexer 7. More specifically, the encoding processor $6_1$ outputs encoded data E10 having a duration of 10 ms, the encoding processor $6_2$ outputs encoded data E20 having a duration of 20 ms, the encoding processor $6_3$ outputs encoded data E40 having a duration of 40 ms, and the encoding processor $6_4$ outputs encoded data E80 having a duration of 80 ms. For example, as shown in FIG. 14, the encoder $6_1$ outputs encoded data 10 ms-1 every 10 ms, the encoder $6_2$ outputs the first half 20 ms-1 and second half 20 ms-2 of the encoded data E20 in order every 10 ms, the encoder $6_3$ outputs one-quarter portions 40 ms-1, 40 ms-2, 40 ms-3, 40 ms-4 of the encoded data E40 in order every 10 ms, and the encoder $6_4$ outputs one-eighth portions 80 ms-1, 80 ms-2, 80 ms-3, 80 ms-4, 80 ms-5, 80 ms-6, 80 ms-7, 80 ms-8, of the encoded data E80 in order every 10 ms.

The multiplexer 7 multiplexes the encoded data that enters from the encoding processors $6_1$-$6_4$ every 10 ms, creates one frame's worth of multiplexed data and inputs the multiplexed encoded data DPDCH to a modulator 9 as in-phase component data. FIG. 14 is a diagram useful in describing the multiplexing method. In the initial $10^{th}$ millisecond, encoded data {10 ms-1, 20 ms-1, 40 ms-1, 80 ms-1} is multiplexed and transmitted as a first frame. Subsequently, in $20^{th}$ to $80^{th}$ milliseconds, the following multiplexed data is created and transmitted as second to eighth frames:

multiplexed data: {10 ms-1, 20 ms-2, 40 ms-2, 80 ms-2} . . . second frame multiplexed data: {10 ms-1, 20 ms-1, 40 ms-3, 80 ms-3} . . . third frame multiplexed data: {10 ms-1, 20 ms-1, 40 ms-4, 80 ms-4} . . . fourth frame multiplexed data: {10 ms-1, 20 ms-1, 40 ms-1, 80 ms-5} . . . fifth frame multiplexed data: {10 ms-1, 20 ms-2, 40 ms-2, 80 ms-6} . . . sixth frame multiplexed data: {10 ms-1, 20 ms-1, 40 ms-3, 80 ms-7} . . . seventh frame multiplexed data: {10 ms-1, 20 ms-2, 40 ms-4, 80 ms-8} . . . eighth frame That is, transport data of the TrCH for which the transmission time interval TTI is 10 ms is transmitted every frame, transport data of the TrCH for which the transmission time interval TTI is 20 ms is transmitted over two frames, transport data of the TrCH for which the transmission time interval TTI is 40 ms is transmitted over four frames, and transport data of the TrCH for which the transmission time interval TTI is 80 ms is transmitted over eight frames.

A control signal generator 8 inputs control data DPCCH such as a pilot PILO, TFCI and TPC to the modulator 9 as quadrature-component data at a fixed symbol rate. QPSK spreaders $9a$, $9b$ subject the transport data DPDCH (I-channel component) and control data DPCCH (Q-channel component) to spread-spectrum modulation using a predetermined spreading code, multipliers $9c$, $9d$ multiply the spread data by gain factors βd, βc, which have been calculated by a gain-factor calculation unit 4, the products undergo a DA conversion in a DA converter (not shown), and the resultant analog signals are input to a QPSK quadrature modulator $9e$. The latter subjects the I-channel signal and Q-channel signal to QPSK quadrature modulation, and a radio transmitter 10 frequency-converts (IF→RF) the baseband signal from the quadrature modulator 9 to a high-frequency signal, performs high-frequency amplification, etc., and transmits the amplified signal from an antenna $ANT_T$.

FIG. 15 is a diagram useful in describing the frame format of an uplink signal from a mobile station (mobile terminal device) to a base station. One frame has a length of 10 ms and is composed of 15 slots S0 to S14. User data DPDCH (Dedicated Physical Data Channel) is mapped to the orthogonal I channel of QPSK modulation and control data DPCCH (Dedicated Physical Control Channel) is mapped to the orthogonal Q channel of QPSK modulation. The number n of bits in each slot in the I channel for user data varies in dependence upon symbol rate. Each slot in the Q channel for control data is composed of ten bits and the symbol rate is a constant 15 ksps. The user data DPDCH is formed by multiplexing the data of one or more transport channels TrCH, and the control data DPCCH is composed of a TPC (Transmission Power Control) bit, TFCI (Transport Format Combination Indicator), PILOT and FBI (Feedback Information).

FIG. 16 is a diagram useful in describing the frame format and slot arrangement of a downlink signal from a base station to a mobile station. One frame has a length of 10 ms and is composed of 15 slots $S_0$ to $S_{14}$. Each slot contains a mixture of user data Data 1, Data 2 and control data TPC, TFCI, PILOT. The data in each slot is distributed in turns to the I channel and Q channel of QPSK quadrature modulation one bit at a time, after which spread-spectrum modulation and quadrature modulation are applied, frequency conversion is carried out and the resultant signal is transmitted to the mobile station.

At reception, a radio receiver 12 subjects a high-frequency signal received from an antenna $ANT_R$ to a frequency conversion (RF→IF conversion) to obtain a baseband signal, after which a demodulator 13 subjects the baseband signal to quadrature detection to generate an in-phase component (I component) signal and a quadrature component (Q component) signal, applies an analog-to-digital conversion to each of these signals, applies despread processing to the I- and Q-component data using a code identical with that of the spreading code, inputs the user data DPDCH to a demultiplexer 15 of the channel codec and inputs the control data to a TPC extraction unit 14. The latter extracts the TPC bit from the control data DPCCH and inputs this to a transmission power controller 11.

As shown in FIG. 17, the following encoded data that has been multiplexed is input to the demultiplexer 15 frame by frame:

multiplexed data: {10 ms-1, 20 ms-1, 40 ms-1, 80 ms-1} . . . first frame
multiplexed data: {10 ms-1, 20 ms-2, 40 ms-2, 80 ms-2} . . . second frame
multiplexed data: {10 ms-1, 20 ms-1, 40 ms-3, 80 ms-3} . . . third frame
multiplexed data: {10 ms-1, 20 ms-2, 40 ms-4, 80 ms-4} . . . fourth frame
multiplexed data: {10 ms-1, 20 ms-1, 40 ms-1, 80 ms-5} . . . fifth frame
multiplexed data: {10 ms-1, 20 ms-2, 40 ms-2, 80 ms-6} . . . sixth frame
multiplexed data: {10 ms-1, 20 ms-1, 40 ms-3, 80 ms-7} . . . seventh frame
multiplexed data: {10 ms-1, 20 ms-2, 40 ms-4, 80 ms-8} . . . eighth frame The demultiplexer 15 inputs the initial 10-ms encoded data 10 ms-1 of each frame to a first decoding processor $16_1$, inputs second 20-ms encoded data 20 ms-1, 20 ms-2 to a second decoding processor $16_2$, inputs third 40-ms encoded data 40 ms-1, 40 ms-2, 40 ms-3, 40 ms-4 to a third decoding processor $16_3$, and inputs fourth 80-ms encoded data 80 ms-1, 80 ms-2, 80 ms-3, 80 ms-4, 80 ms-5, 80 ms-6, 80 ms-7, 80 ms-8 to a fourth decoding processor $16_4$. That is, data of the service for which the transmission time interval TTI 10 ms is received frame by frame, data of the service for which the transmission time interval TTI is 20 ms is received over two frames, data of the service for which the transmission time interval TTI is 40 ms is received over four frames and data of the service for which the transmission time interval TTI is 80 ms is received over eight frames.

The first decoding processor $16_1$, which applies error correction processing to the encoded data of length 10 ms and decodes the original transport data, decodes the encoded data 10 ms-1 and inputs the decoded data to a succeeding receive buffer $17_1$ every 10 ms. The second decoding processor $16_2$, which applies error correction processing to the encoded data for which the transmission time interval TTI is 20 ms and decodes the original transport data, decodes the encoded data 20 ms-1, 20 ms-2 and inputs the decoded data to a succeeding receive buffer $17_2$ every 20 ms. The third decoding processor $16_3$, which applies error correction processing to the encoded data for which the transmission time interval TTI is 40 ms and decodes the original transport data, decodes the encoded data 40 ms-1 to 40 ms-4 and inputs the decoded data to a succeeding receive buffer $17_3$ every 40 ms. The fourth decoding processor $16_4$, which applies error correction processing to the encoded data for which the transmission time interval TTI is 80 ms and decodes the original transport data, decodes the encoded data 80 ms-1 to 80 ms-8 and inputs the decoded data to a succeeding receive buffer $17_4$ every 80 ms.

The receive buffers $17_1$, $17_2$, $17_3$ and $17_4$ write the decoded data to buffer memories every 10 ms, 20 ms, 40 ms and 80 ms, read the decoded data out of the buffer memories continuously at a prescribed speed and input the data to the TAF IF 3. The TAF IF 3 selectively inputs the decoded data, which enters from each of the receive buffers $17_1$ to $17_4$, to the TAF units 1a to 1n and host application 2.

Multiplexing and Demultiplexing Control

The above is a description of the overall operation of the mobile terminal. Multiplexing and demultiplexing will be described in greater detail below. The data transceive time intervals of the W-CDMA system are stipulated as being 10, 20, 40 and 80 ms, as mentioned above. Such a time interval is referred to as a TTI (Transmission Time Interval), as pointed out above. The transceive timing is as shown in FIG. 18 on a per-TTI basis.

The encoding processor 6i (i=1 to 4) of the channel codec in this W-CDMA system accepts data transmitted from a higher layer, executes encoding processing on a per-transport-channel (TrCH) basis, multiplexes the encoded data, maps the multiplexed data to a physical channel and transmits the data. Conversely, the decoding processor 16i (i=1 to 4) of the channel codec demultiplexes the data, which has been multiplexed onto the physical channel, on a per-transport-channel (TrCH) basis, executes decoding processing and delivers the results to the TAF IF 3.

When communication starts, information necessary for encoding processing and multiplexed transmission, such as the encoding scheme (convolutional encoding, turbo encoding, etc.), transmission time interval TTI and transport format TFI, are specified for each transport channel (TrCH) by the higher layer in the TAF IF 3. On the basis of bit rate of the transport data of each TrCH and the transport format information (TFI table) of each TrCH specified by the higher layer, the TAF IF 3 decides a combination (transport format combination TFC) of transport data lengths every transmission time interval TTI of the TrCHs, demultiplexes the transport data of each TrCH on a per-TTI basis and inputs the demultiplexed data to the channel codec. The latter performs encoding in accordance with the encoding scheme specified. If transport data is encoded on each transport channel (TrCH), the data is multiplexed frame by frame, mapped to the physical channel and transmitted. The physical-channel data is transmitted in units of 10 ms since one frame has a duration of 10 ms. Accordingly, data having a TTI of 20 ms or greater is divided evenly into frame units of 10 ms each and the data is then transmitted upon being mapped to the physical channel taking the time TTI. FIG. 19 illustrates an example in which two transport channels TrCH#1, TrCH#2 of TTIs 20 ms and 40 ms, respectively, are multiplexed and transmitted (TrCH#1: TTI=20 ms, TrCH#2:

TTI=40 ms). In FIG. 19, TrCH#1-1 and TrCH#1-2 of first and second frames are the initial 20 ms of data of TrCH#1, and TrCH#1-3 and TrCH#1-4 of third and fourth frames are the next 20 ms of data of TrCH#1.

When the encoded data of each transport channel (TrCH) is multiplexed, mapped to a physical channel and transmitted, a parameter indicating how the encoded data of each transport channel TrCH has been multiplexed is created in such a manner that demultiplexing can be performed correctly on the receiving side, and this parameter is transmitted upon being attached to the physical-channel data. This parameter is referred to as a TFCI (Transport Format Combination Indicator). The TFCI is uniquely decided by a combination of transport formats which specify the bit length (number of blocks x block length) per TTI of data transmitted by each transport channel (TrCH).

Transport formats are numbered and each is denoted by a TFI (Transport Format Indicator). In FIG. 20, (A), (B) illustrate examples of TFI tables in a case where user data DPDCH is multiplexed and transmitted on transport channel TrCH#1 and transport channel TrCH#2. There are six types of TFIs of TrCH#1 for the user data. These are formats for which the bit lengths per transmission time interval TTI thereof are 0×336 bits, 1×336 bits, 2×336 bits, 4×336 bits, 8×336 bits and 12×336 bits; the TFIs are 0, 1, 2, 3, 4 and 5. Further, there are two types of TFIs of TrCH#2 for the control data. These are formats for which the bit lengths per transmission time interval TTI thereof are 0×148 bits and 1×148, and the TFIs are 0 and 1, respectively.

If the transport channels are only of the two types TrCH#1 and TrCH#2, then the combinations of TFIs of TrCH#1 and TrCH#2 will be a total of 12 (6×2), as shown in (C) of FIG. 20, and a CTFC (Calculated Transport Format Combination) can be calculated for each combination using a CTFC calculation formula. It should be noted that the column on the right side of FIG. 20(C) shows the CTFCs. Since the transmit and receive sides possess a TFCI-CTFC correspondence table shown in (D) of FIG. 20, the transmit side converts a calculated CTFC to a TFCI using this correspondence table, encodes the TFCI and transmits the same. For example, if data for which the number of bits per TTI is 2×336 bits is transmitted from the TrCH#1 over a period of 20 ms, data for which the number of bits per TTI is 1×336 bits is transmitted from the TrCH#1 in succession over a period of 20 ms and data for which the number of bits per TTI is 1×148 bits is transmitted from the TrCH#2 over a period of 40 ms, then four frame's worth of multiplexed data every 10 ms becomes the combinations of TFIs shown in (E) of FIG. 20. Accordingly, the CTFC in each combination is calculated, this CTFC is converted to a TFCI using the correspondence table of FIG. 20(D), and this TFCI is transmitted upon being encoded.

A specific example will be given using FIG. 21. Consider a case where 148-bit data is mapped to LCH0 from the host application 2, 8400-bit data is mapped to LCH1 from the TAF unit 1a and this data is sent to the TAF IF 3. Since the connectable LCHs and TrCHs are ① LCH0 and TrCH1 and ② LCH1 and TrCH2, channel encoding processing is possible on LCH0 as TrCH1 and on LCH1 and TrCH2.

A plurality of transport formats of each TrCH is specified from the higher layer. The transport format indicates the transport data length of the transmission time interval TTI specified in advance from the higher layer, and the transport data length is expressed by transport block count (number of TrBks)×TrBk bit count. The TTI of TrCH1 is 40 ms, the transport formats are of two types, namely 0×148 bits and 1×148 bits, the TTI of TrCH1 is 20 ms, and there are nine types of transport formats, namely 0×336 bits, 1×336 bits, 2×336 bits, 3×336 bits, 4×336 bits, 8×336 bits, 16×336 bits, 20×336 bits and 24×336 bits.

When each TrCH is multiplexed and transmitted, it is necessary to raise throughput as much as possible and therefore a transport format that is capable of transmitting as much data as possible is selected. In the specific example of FIG. 21, the data to be transmitted on LCH0 is 148 bits and the transport formats of TrCH1 are 148×0 bits and 148×1 bits, and therefore 148×1 is selected and encoding processing is executed at TTI=40 ms. Further, the data to be transmitted on LCH1 is 8400 bits and the transport formats of TrCH2 are 336×0 bits, 336×1 bits, 336×2 bits, 336×4 bits, 336×8 bits, 336×12 bits, 336×16 bits, 336×20 bits and 336×24 bits. Since the format for the greatest number of bits is that for which 336 bits×24=8064 holds and, moreover, since 8064 bits×8400 bits holds, data is transmitted in the 336 bit×24 format in the initial TTI of 20 ms. In the next TTI of 20 ms, 8400−8064=336=336 bits×1 holds and therefore data is transmitted in the 336 bit×1 format. After TTI selection processing of TrCH1, TrCH2, encoding processing of each TrCH is executed and TrCH multiplexing is carried out.

FIG. 22 illustrates the amount of user data, after TrCH multiplexing, along a time axis. Over time ①, TrCH1: 148 bits×1 (TTI=40 ms holds, and therefore one-fourth of the data) and TrCH2: 336 bits×24 (TTI=20 ms holds, and therefore one-half of the data) is multiplexed. Over time ②, TrCH1: 148 bits×1 (TTI=40 ms holds, and therefore one-fourth of the data) and TrCH2: 336 bits×24 (TTI=20 ms holds, and therefore one-half of the data) is multiplexed. Over time ③, TrCH1: 148 bits×1 (TTI=40 ms holds, and therefore one-fourth of the data) and TrCH2: 336 bits×1 (TTI=20 ms holds, and therefore one-half of the data) is multiplexed. Over time ④, TrCH1: 148 bits×1 (TTI=40 ms holds, and therefore one-fourth of the data) and TrCH2: 336 bits×1 (TTI=20 ms holds, and therefore one-half of the data) is multiplexed.

Control for Selection of TFC Based Upon Transmission Power

3GPP TS25, 321 stipulates that the transport format combination TFC be selected in such a manner that the maximum transmission power of the mobile terminal will not be exceeded. TFC selection control usually considered in order to satisfy the above stipulation will now be described.

In a W-CMDA system that complies with the 3GPP standard, the following processing is executed when data (uplink data) is transmitted from a mobile terminal to a base station:

The transport format combination (TFC) of each transport channel TrCH is decided, user data is defined as DPDCH via TrCH encoding processing and TrCH multiplex processing, and transmission processing is executed.

Initial transmission power at the time of transmission processing is decided by a value ("initial.power") reported from the higher layer beforehand. The gain-factor calculation unit 4 (FIG. 13) calculates the gain factors βd, βc, which are transmission-power control factors, frame by frame in accordance with the amount of data transmitted, and the multipliers 9c, 9d of the modulator 9 multiply the user data DPDCH and control data DPCCH, which are obtained after spreading, by the gain factors βd, βc, respectively, thereby applying weighting. The value of one of the gain factors βd, βc is always 1, and it is so arranged that βd and βc will fall within the ranges 0 to 1.0 and 0.0667 to 1.0, respectively, thereby indicating the relative ratio between then DPDCH and DPCCH power values.

The gain factors βd and βc are parameters that vary in dependence upon the amount of user data. The gain factor βd approaches 1.0 when the amount of user data increases, approaches zero when the amount of user data decreases and becomes zero when there is no user data. Conversely, βd, βc do not change if the amount of user data does not change.

A Rate Matching Attribute (referred to below as the "rate matching ratio", or "RM ratio"), which is specified beforehand by the higher layer on a per-TrCH basis, is used to decide the gain factors βd, βc. The higher layer gives βdref and βcref as reference gain factors for any combination (TFC). In accordance with $$Kref = \Sigma_i RMi \times Nrefi \quad (1)$$

the following equation:

$$Kref = \sum_i RMi \times Nrefi \quad (1)$$

where ① i represents the number of each TrCH, ② data length after encoding processing of each TrCHi is calculated is Nrefi represents this value, and ③ Rmi represents the RM ratio of TrCHi, the gain-factor calculation unit 4 obtains the sum total of data lengths RmixNrefi prevailing prior to rate matching processing of each TrCHi with respect to the reference combination. Similarly, after the selection of the jth transport format combination, the gain-factor calculation unit 4, in accordance with the following equation:

$$Kj = \Sigma_i RMi \times Nji \quad (2)$$

$$Kj = \sum_i RMi \times Nji \quad (2)$$

obtains the sum total of data lengths RMixNji prevailing prior to rate matching processing of each TrCHi with respect to a TFCj to be actually transmitted.

Next, the gain-factor calculation unit 4 obtains Aj by the following equation:

$$Aj = \frac{\beta dref}{\beta cref} \times \sqrt{Kj/Kref} \quad (3)$$

If the result of calculation is that Aj>1 holds, the largest value is selected from Table 1 below within the limits of βd=1.0 and βc≦1/Aj (if βc=0 holds, then a conversion is made to βc=0.0667). On the other hand, if Aj≦1 holds, the smallest value is selected from Table 1 within the limits of βc=1.0 and βd≧Aj. When the gain factors βd, βc are found, the transmission power value Pt is determined from Equations (4) to (8) below.

TABLE 1

| |
|---|
| 1.0 |
| 0.9333 |
| 0.8666 |
| 0.8000 |
| 0.7333 |
| 0.6667 |

TABLE 1-continued

| |
|---|
| 0.6000 |
| 0.5333 |
| 0.4667 |
| 0.4000 |
| 0.3333 |
| 0.2667 |
| 0.2000 |
| 0.1333 |
| 0.0667 |
| 0 |

After the channel is opened, the transmission power controller 11 obtains the DPCCH transmission power value PDPCCH and DPDCH transmission power value PDPDCH from the initial transmission power value initial.power and a minimum power value rang.mini, which are designated beforehand by the higher layer, in accordance with the following equations (see FIG. 23):

$$PDPCCH = \text{initial.power} - \text{rang.mini} \ (dBm) \quad (4)$$

$$PDPDCH = (\beta d/\beta c) \times PDPCCH (dBm) \quad (5)$$

Further, the transmission power Pt is given by the following equation:

$$Pt = PDPDCH + PDPCCH (dBm) \quad (6)$$

Further, a base station measures the channel quality of uplink data transmitted from a mobile station, determines whether a target channel quality has been attained and, on the basis of the determination, instructs the mobile station to raise or lower the transmission power of the uplink slot by slot by a TPC bit, which is one item of control information in the downlink data. The amount of increase or decrease (power-up step=power-down step, where "step" is a power parameter) at this time also is specified by the higher layer. That is, "0" is inserted in the TPC segment of each slot shown in FIG. 16 if channel quality is good, and "1" is inserted if channel quality is poor. On the basis of the TPC bit segment of the downlink, the transmission power controller 11 of the mobile station controls the transmission power value Pt slot by slot in accordance with the following equations using the power-up step and power-down step (dB) specified beforehand by the higher layer:

when TPC bit=0: $Pt = Pt - \text{step}(dBm)$ (7)

when TPC bit=1: $Pt = Pt + \text{step}(dBm)$ (8)

FIG. 23 illustrates an example of the fluctuation in transmission power at the mobile station. Here time is plotted along the horizontal axis, and Pt represents the transmission power, rang.max the maximum transmission power reported from the higher layer beforehand, initial.power the initial transmission power reported from the higher layer beforehand, and rang.mini the minimum transmission power reported from the higher layer beforehand. It will be understood that uplink transmission power fluctuates, slot by slot, from the initial.power owing to control based upon the TPC bit.

FIG. 24 is a control processing flowchart for selecting TFC in such a manner that the transmission power value Pt will not exceed the maximum transmission power.

Before the channel is opened, the higher layer gives notification of the following: ① the initial transmission power value initial.power, which is a power parameter; ② the minimum transmission power value rang.mini, which is a power parameter; ③ the maximum transmission power value rang.max, which is a power parameter; ④ the power-up and power-down step, which is a power parameter, based upon the TPC bit; ⑤ the reference gain factors βd, βc; ⑥ the TrCH-LCH connectability status, transmission time interval TTI and transport format information (TFI table), which are TrCH parameters; and ⑦ the RM ratio. Accordingly, these are received and saved (step 1001).

Next, when the TAF units 1a to in and host application 2 generate user data, these items of user data are collected in the TAF IF 3 and the latter selects the transport format combination TFC that will provide the highest throughput possible using the TrCH parameters (step 1002).

Next, by using the TrCH parameters from the selected TFC, the gain-factor calculation unit 4 calculates the gain factors βd, βc in accordance with Equations (1) to (3) and inputs these gain factors βd, βc to the modulator 9 and transmission power controller 11 (step 1003).

Using Equations (9) to (11) below, the transmission power controller 11 estimates a maximum value $Pt_{13}$ max of transmission power (step 1004). Specifically, the transmission power controller 11 calculates the transmission power value Pt from the power parameters and gain factors βd, βc in accordance with the following equation:

$$Pt = (1 + \beta d/\beta c) \times (\text{initial.power} - \text{rang.mini}) \quad (9)$$

The larger βd/βc, i.e., the greater the amount of data, the larger Pt becomes. Furthermore, if we let step_max represent a maximum power-up step (relative to the power parameter "step") per frame, we obtain the following because one frame is composed of 15 slots:

$$\text{step\_max} = \text{step} \times 15 \quad (10)$$

Therefore, the transmission power value Pt_max estimated to be the maximum per frame is found from Equations (9), (10) by the following equation:

$$Pt\_max = (1 + \beta d/\beta c) \times (\text{initial.power} - \text{rang.mini}) + \text{step} \times 15 \quad (11)$$

Next, the transmission power controller 11 determines whether Pt_max exceeds the maximum transmission power value range.max (step 1005) and, if the decision rendered is "YES", so notifies the TAF IF 3. In response, the TAF IF 3 changes TFC by the processing of step 1002, and the gain-factor calculation unit 4 and transmission power controller 11 repeat the processing from step 1003 onward. If a TFC according to which range.max is not exceeded is eventually selected, then the mobile station multiplexes and transmits the transport data of each TrCH based upon this TFC (step 1006).

With the prior-art method, a TFC is selected, transmission power is estimated after the calculation of the gain factors, it is determined whether the estimated transmission power exceeds the maximum transmission power range.max, and it is required that the TFC be re-selected if the maximum transmission power is exceeded. With the prior-art method, therefore, a large number of repetitions and a large number of processing steps are needed to decide a TFC according to which transmission power will not exceed the maximum transmission power range.max. A problem which arises is that the TFC cannot be decided at high speed. In addition, since the total number of processing steps is large, the end result is an increase in power consumption.

Further, a W-CDMA system is such that the smaller the total thermal noise due to the transmission power of a plurality of mobile stations present in the same cell, the greater the communication traffic can be made. The method of selecting TFC based upon transmission power according to the prior art is such that if mobile stations having different user-data transmission capabilities are mixed in one and the same cell, a situation arises in which mobile stations having a high transmission capability transmit upon selecting the TFC that results in maximum transmission power. In such case there is an increase in the total thermal noise within the cell and the base station limits the maximum transmission power of the mobile stations whose transmission capability is low. As a result, a limitation is imposed upon communication traffic.

SUMMARY OF THE INVENTION

Accordingly, an object of the present invention is to so arrange it that a TFC can be decided at high speed in such a manner that transmission power falls below a designated maximum transmission power or takes on an appropriate value.

Another object of the present invention is to so arrange it that a mobile terminal apparatus (mobile station) having a high transmission capability will not select a TFC that results in maximum transmission power.

According to the present invention, the foregoing objects are attained by providing a mobile terminal apparatus for selecting a transport format combination (TFC) that stipulates a combination of transport data lengths of prescribed transmission time intervals (TTI) of transport channels, multiplexing transport data of each of the transport channels based upon the TFC that has been selected, and transmitting the data. A method of selecting the TFC also is provided. Transport format combinations are classified based upon amount of multiplexed transport data of each transport channel, the class of a TFC to be selected is decided based upon a transmission power value, and a TFC is selected from the class decided. Deciding the TFC class includes measuring a transmission power value and raising or lowering the class of the TFC to be selected based upon the size relationship between a designated maximum transmission power value and the measured transmission power value.

Thus, TFCs are classified based upon amount of data multiplexed and transmitted. It is so arranged that if transmission power exceeds the designated maximum transmission power with the present class, then a TFC is selected from the next class. Since the difference in amount of transport data is large between classes, therefore, transmission power can be kept below the designated maximum transmission power by a single control operation. As a result, the TFC can be decided at high speed. Further, if the transmission power exceeds the designated maximum transmission power, the TFC must be selected from the next class for which the difference in amount of transport data in comparison with the present class is large. This means that a TFC that results in maximum transmission power is not allowed to be selected even in the case of a mobile station having a high transmission capability.

If it is so arranged that the TFC class is decided by measuring the transmission power value and calculating the class of the TFC to be selected based upon the difference between an appropriate transmission power value and the measured transmission power value, then the transmission power can be held below the designated maximum transmission power in reliable fashion by a single TFC-class changeover control operation. This makes it possible to decide the TFC at high speed.

Further, the classifying operation includes performing a rate-matching calculation using transport-data bit length of each transport channel stipulated by a TFC and a rate matching ratio of each transport channel, obtaining data bit length after rate matching, and classifying a TFC based upon the data bit length after rate matching. If this arrangement is adopted, a TFC can be decided taking into consideration the amount of data increase or decrease due to rate matching. Further, data bit length after rate matching can be decided so as to become any transport-data bit length of a plurality of stages (150, 300, 600, 1200, 2400, 4800, 9600 bps) per frame stipulated by a 3GPP-compliant transport slot format. As a result, TFCs can be classified in simple fashion in accordance with bit length per frame in 3GPP.

Further, classification is performed as follows: A classification numerical value $N_{comb\ max}$ is calculated using maximum block length and maximum number of blocks of each transport channel obtained from transport format information (a TFI table) TFI that specifies one or more transport-data bit lengths (represented by block length and number of blocks) of transmission time intervals TTI of each of the transport channels, the transmission time intervals TTI of every transport channel and a rate matching ratio of each transport channel. The classification numerical value $N_{comb\ max}$ is divided successively by n, e.g., by 2, thereby deciding the numerical range of each class. Under these conditions, a classification numerical value N is calculated using block length and number of blocks of each transport channel stipulated by a prescribed TFC, the transmission time intervals TTI of every transport channel and a rate matching ratio of each transport channel, the TFC is classified based upon the above-mentioned numerical range to which the classification numerical value N belongs, classification is performed similarly for other TFCs.

If classification is performed in this manner, the classification can be carried out at high speed through simple calculation. Moreover, it is possible to perform classification equivalent to classification that is in accordance with bit length per frame in 3GPP.

Other features and advantages of the present invention will be apparent from the following description taken in conjunction with the accompanying drawings.

BRIEF DESCRIPTION OF THE DRAWINGS

FIG. 10B is a table useful in describing the numerical ranges of classes obtained by simple classification;

FIG. 11 shows an example of a classification table created by a simple method;

FIG. 12 shows a classification comparison table;

FIG. 20 is a diagram useful in describing TFC and TTI according to the prior art;

DESCRIPTION OF THE PREFERRED EMBODIMENTS (A) Structure of Mobile Communication Terminal (Mobile Station) According to the Invention FIG. 1 is a block diagram illustrating the structure of a mobile communication terminal (mobile station) according to the present invention. User data and control data, sent from a plurality of terminal access function units (abbreviated to "TAF" below) 51a to 51n and a host application 52 upon being mapped to prescribed local channels (LCH), is collected together in a terminal access function interface TAF IF 53. The TAF IF 53 has a TFC decision unit 53a for checking the state of a connection between an LCH and a transport channel (abbreviated to "TrCH" below) from connection information designated beforehand by a higher layer. If the LCH has been connected to the TrCH, then, in accordance with transport format information (a TFI table) that specifies transport data lengths of prescribed transmission time intervals TTI of the TrCHs designated similarly by the higher layer, the TFC decision unit 53a decides a combination TFC of transport formats of TrCHs capable of transmitting as much data as possible.

The TAF IF 53 has a TrCH data demultiplexer 53b for recognizing transport data length every transmission time interval TTI of each TrCH based upon the TFC that has been decided, separating the transport data of each TrCH every transmission time interval TTI based upon the transport data length, and inputting the separated data to a channel codec 54.

Figure 13:
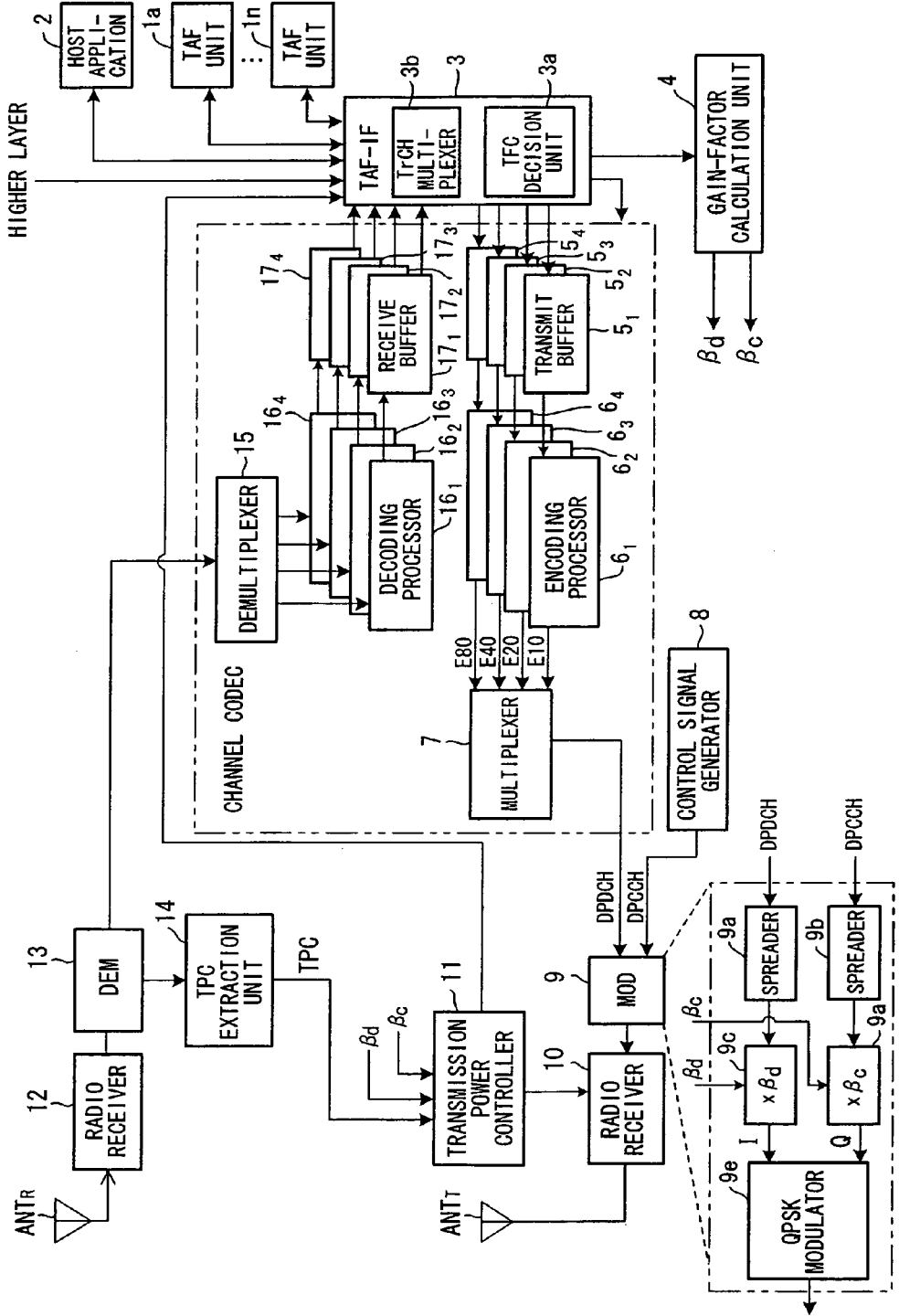
FIG. 13 is a block diagram of a CDMA mobile terminal device according to the prior art.
Figure 14:
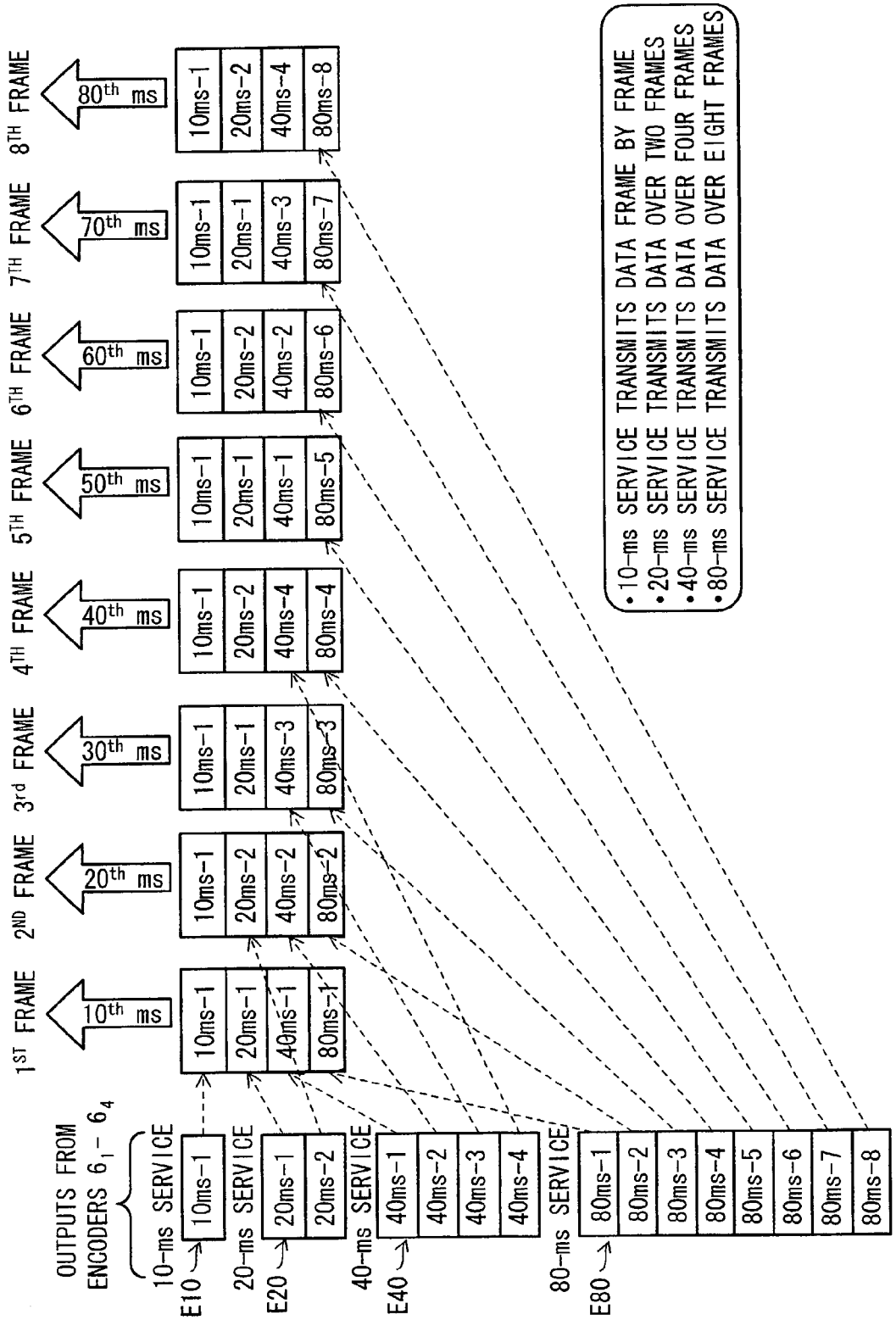
FIG. 14 is a diagram useful in describing a multiplexing method according to the prior art
Figure 15:
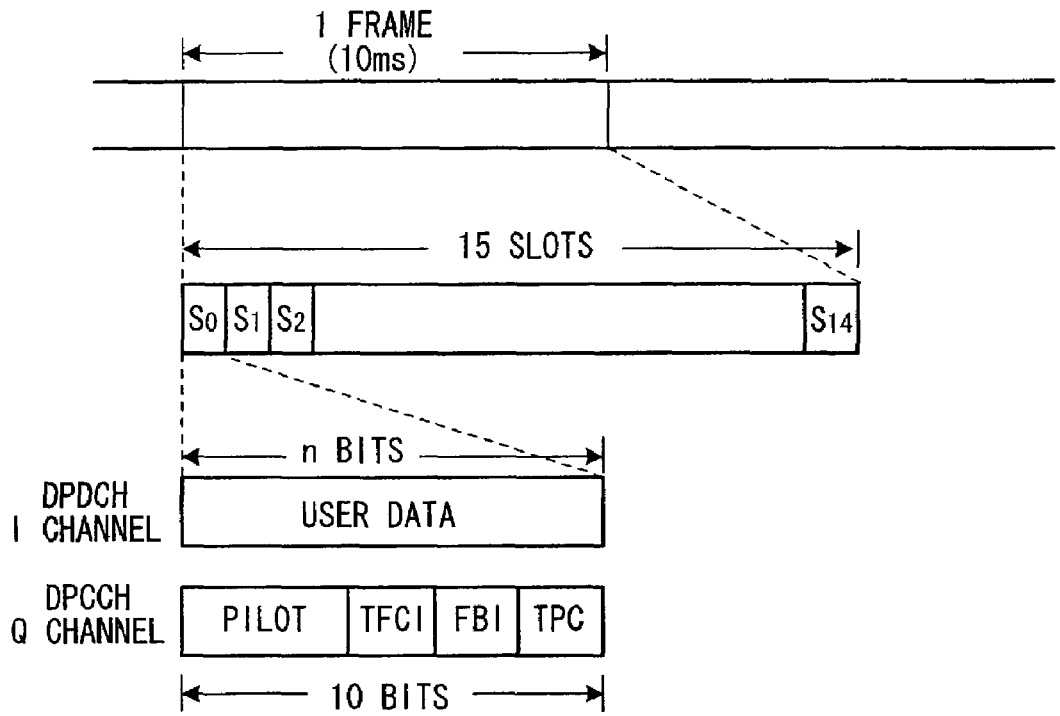
FIG. 15 is a diagram useful in describing the frame format of an uplink signal according to the prior art.
Figure 16:
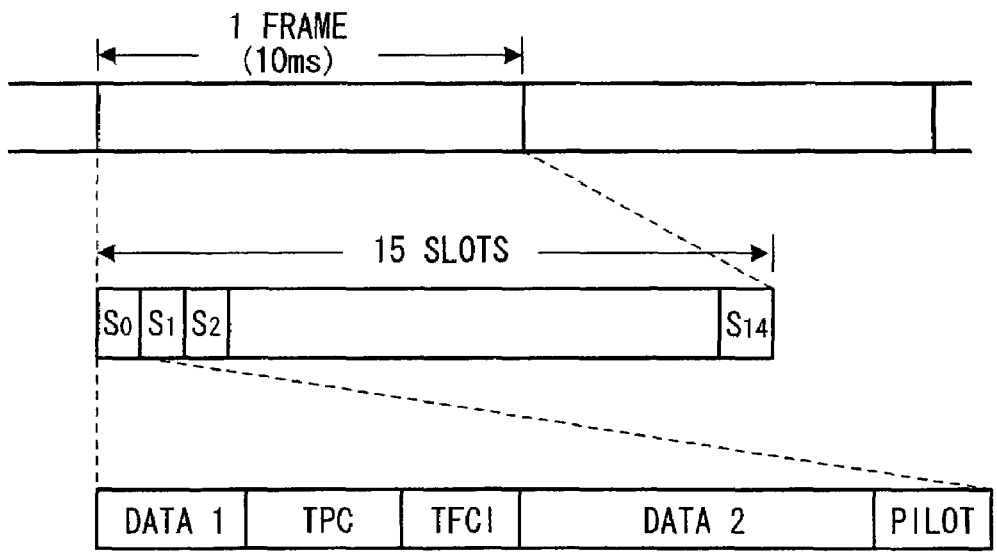
FIG. 16 is a diagram useful in describing the frame format and slot arrangement of a downlink signal according to the prior art.
Figure 17:
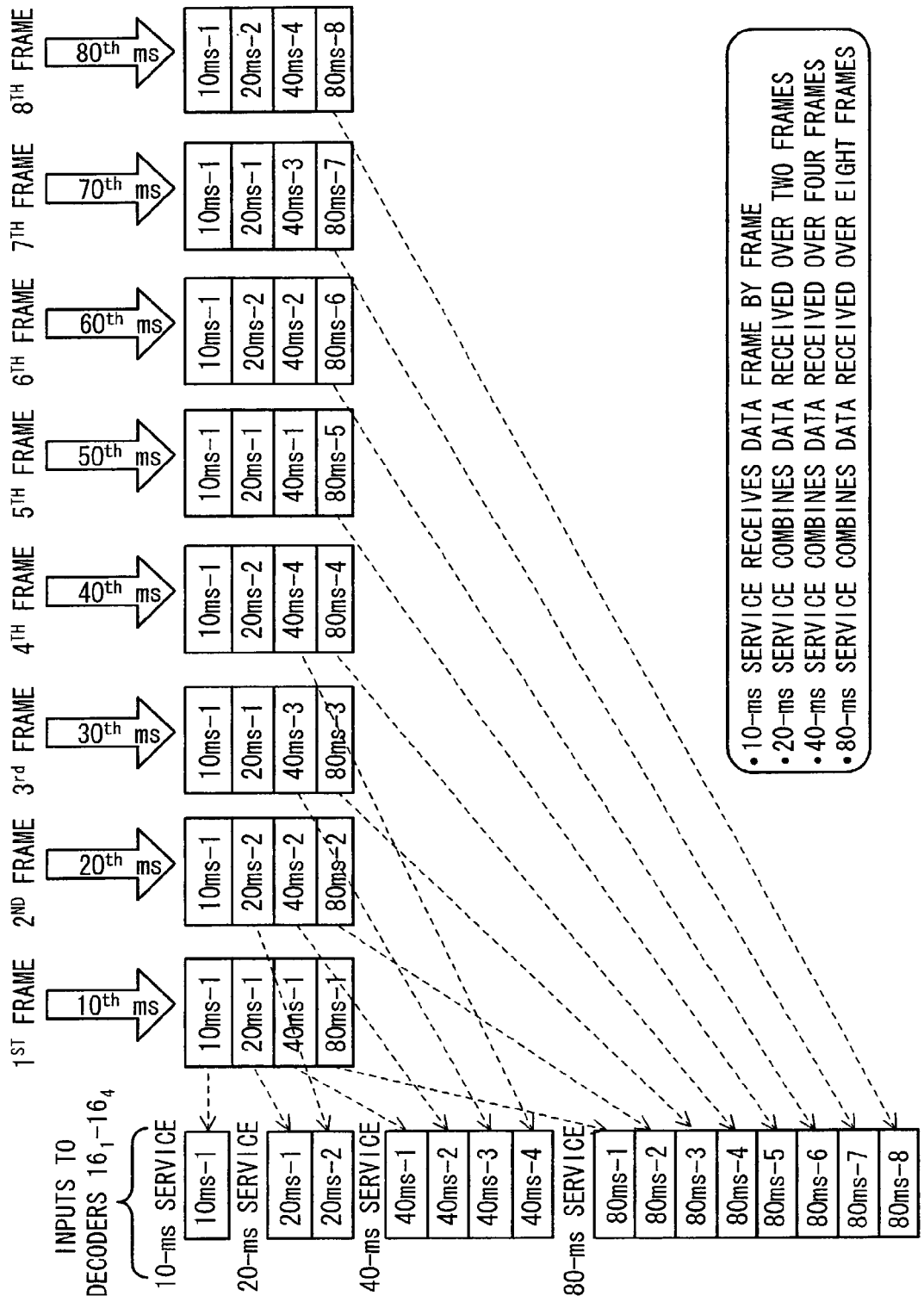
FIG. 17 is a diagram useful in describing a demultiplexing method according to the prior art.
Figure 18:
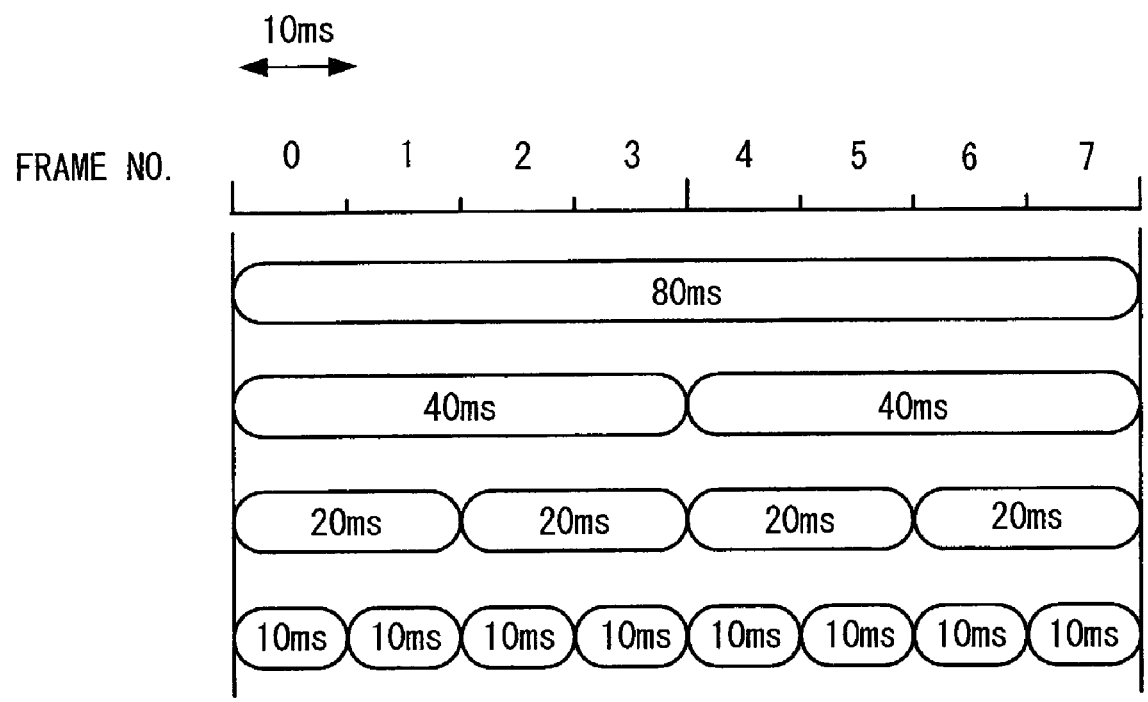
FIG. 18 is a diagram useful in describing transceive timing according to the prior art.
Figure 19:
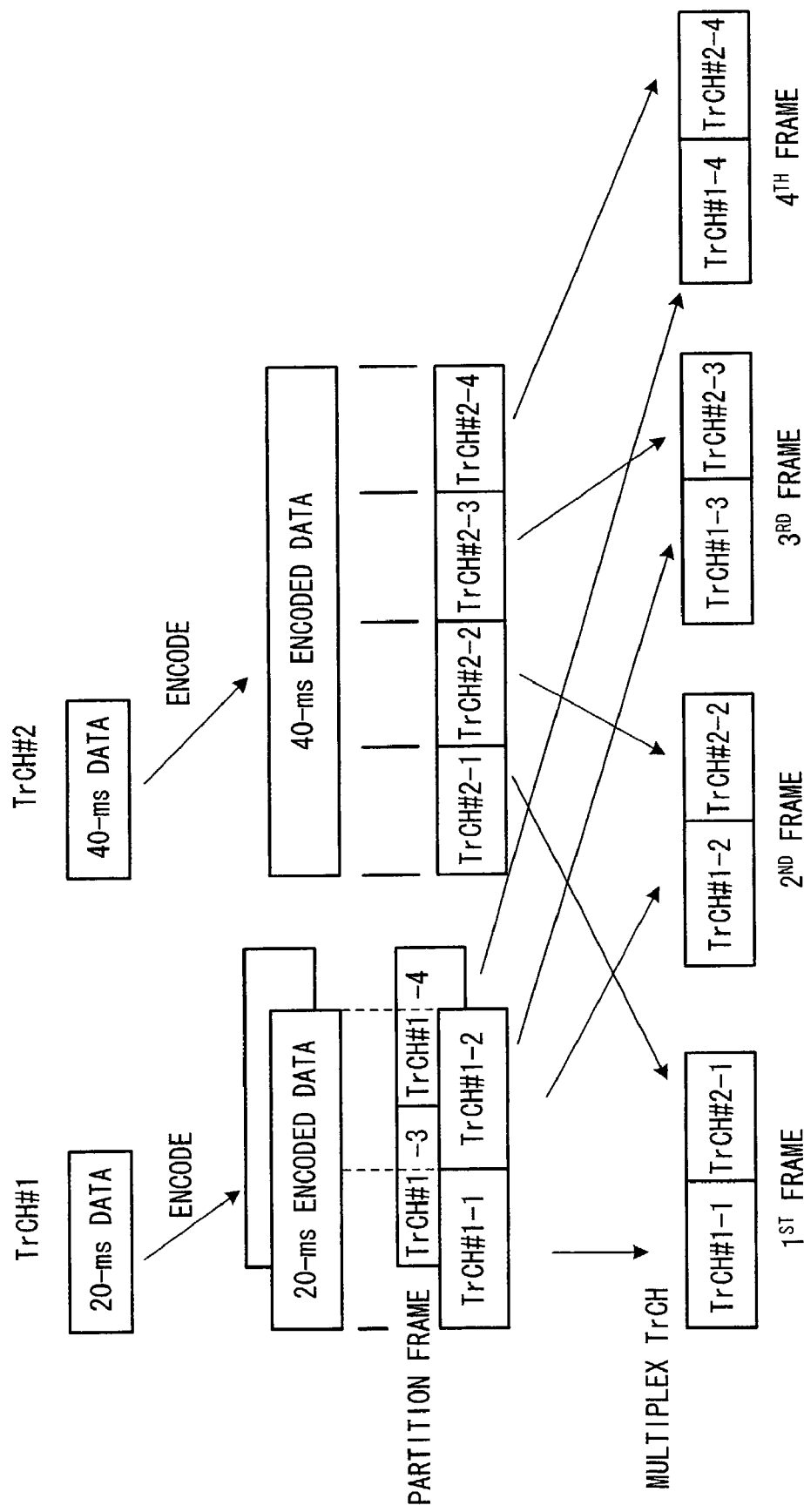
FIG. 19 illustrates an example of processing for multiplexing transport channels (TrCH) according to the prior art.
Figure 21:
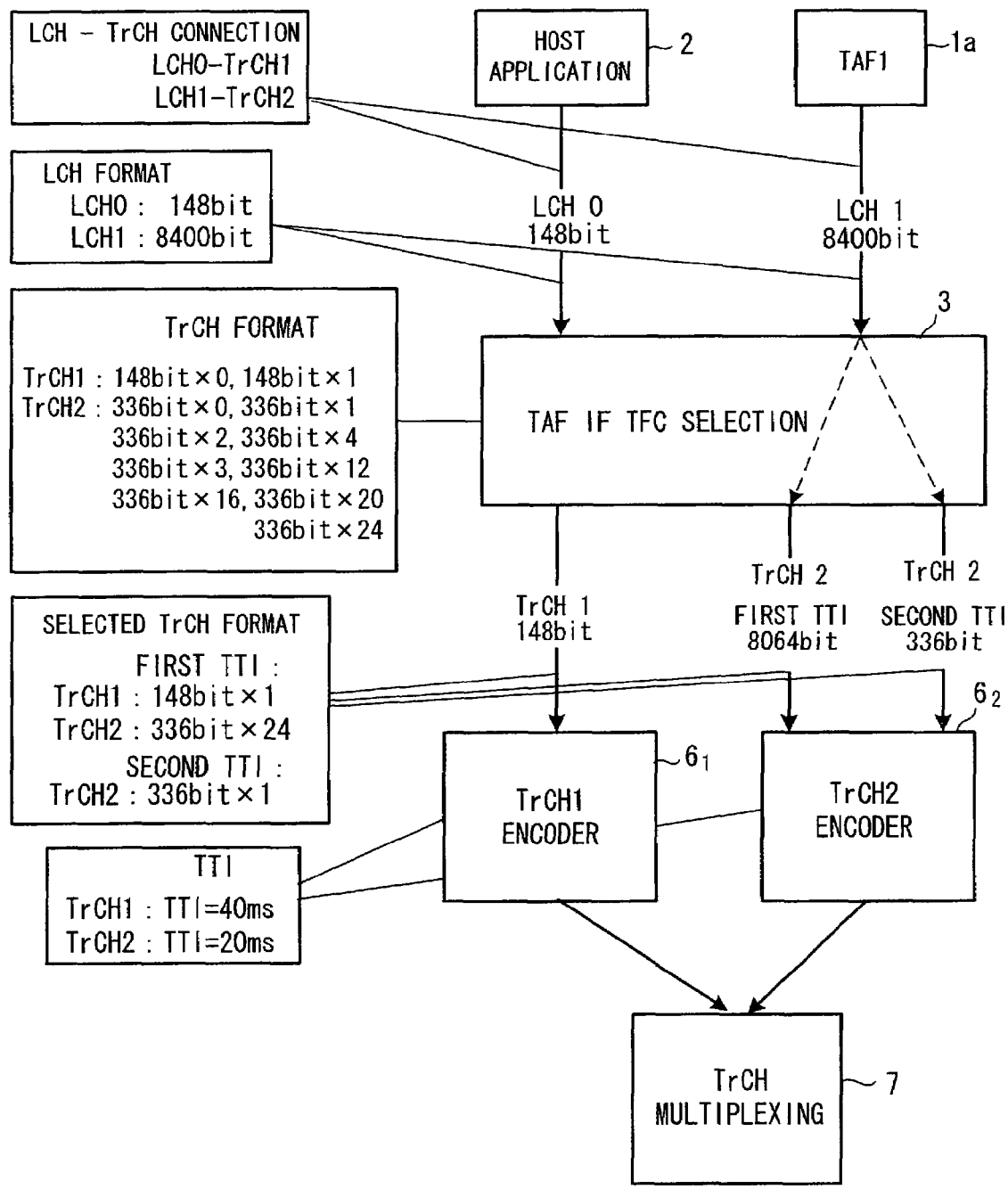
FIG. 21 shows a specific example of multiplex transmission according to the prior art.
Figure 22:
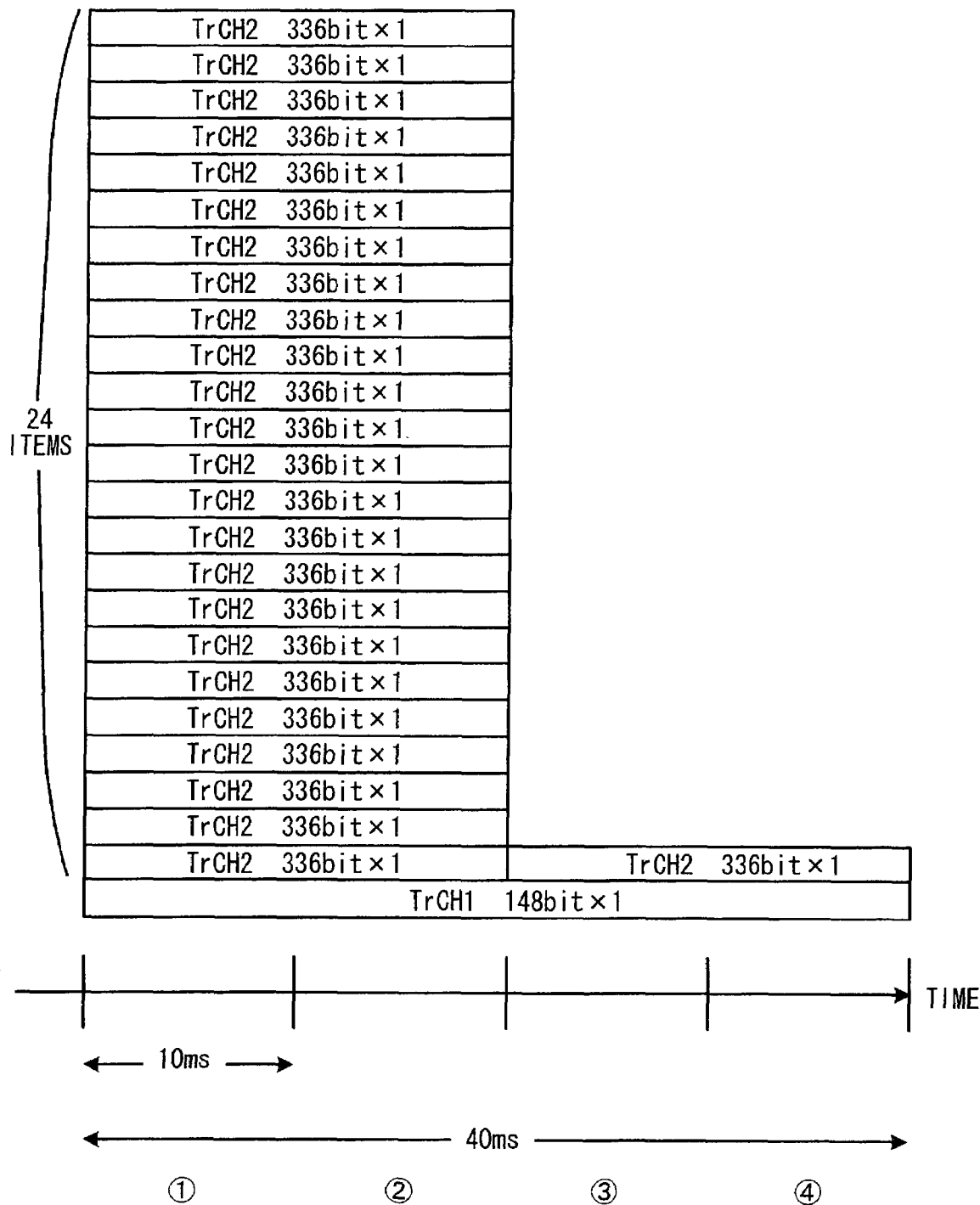
FIG. 22 is a diagram useful in describing amount of user data with respect to a time axis after TrCH multiplexing according to the prior art.
Figure 23:
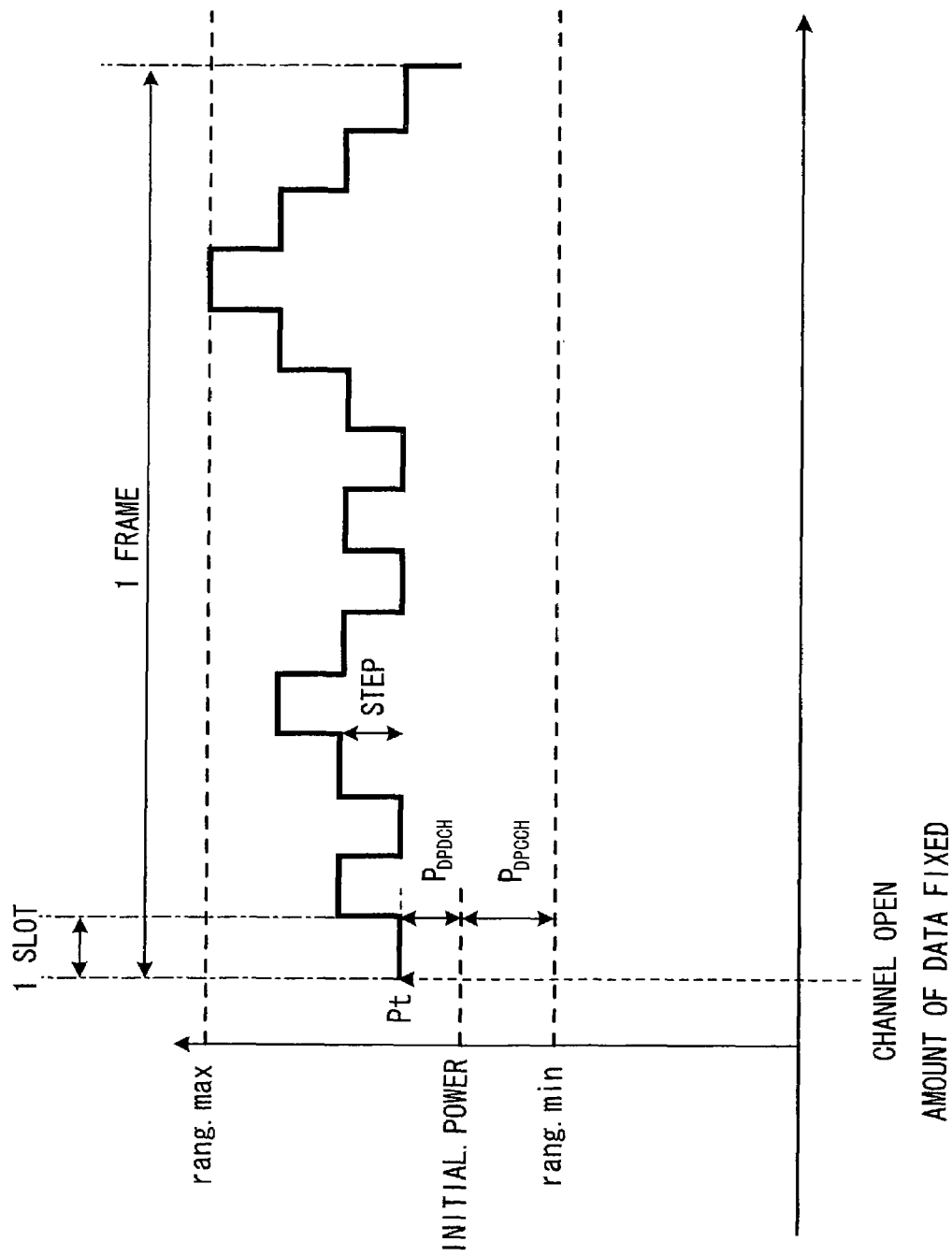
FIG. 23 illustrates an example of a fluctuation in transmission power at a mobile station device according to the prior art.
Figure 24:
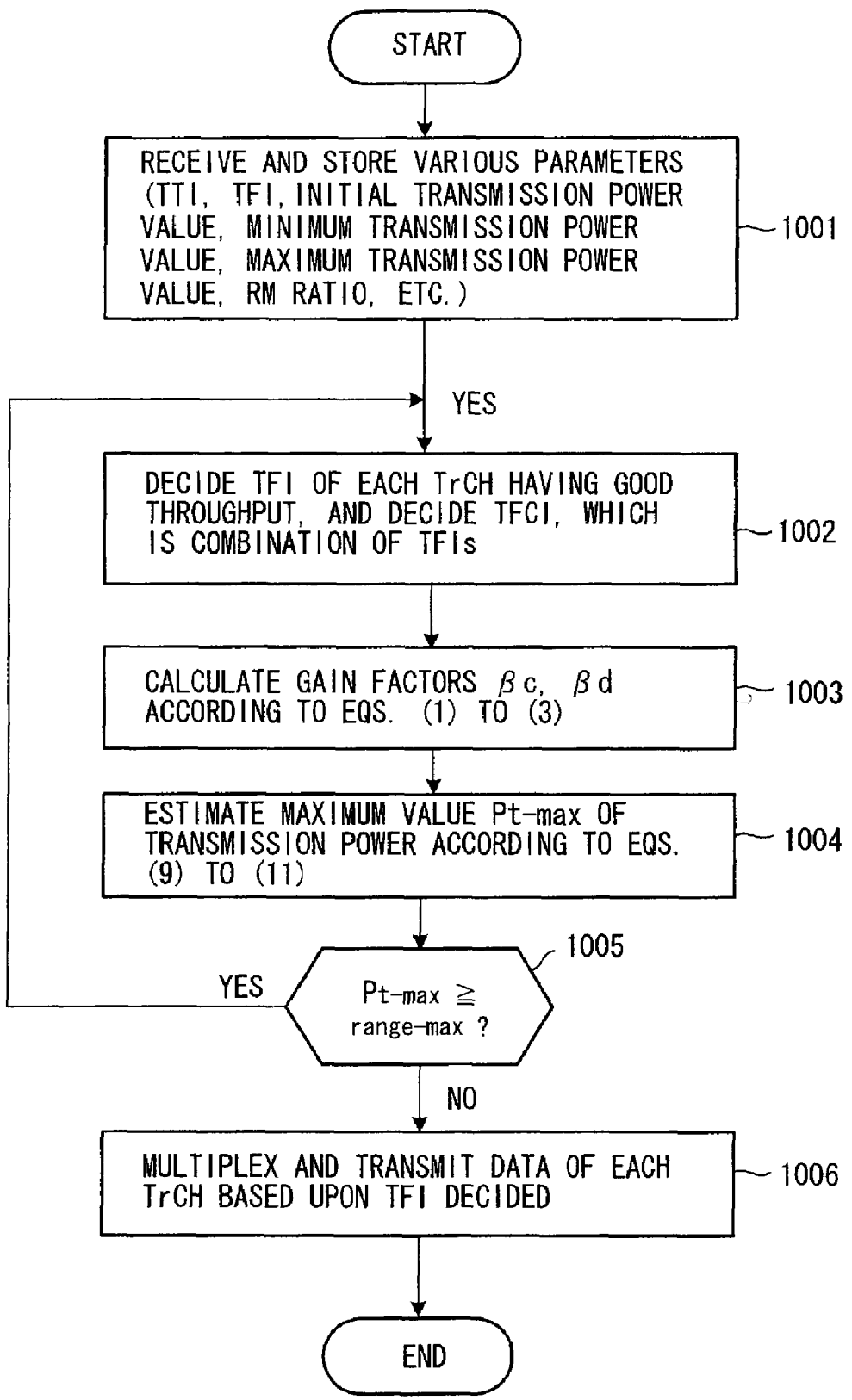
FIG. 24 is a flowchart of control processing for selecting a TFC in such a manner than transmission power value will not exceed a maximum transmission power according to the prior art.

The channel codec 54, which has a structure similar to that of the prior art shown in FIG. 13, encodes the transport data of each TrCH in accordance with convolutional or turbo encoding, then multiplexes the encoded data of each TrCH every 10 ms, creates one frame's worth of multiplexed data and inputs the multiplexed encoded data DPDCH to a modulator 55 as in-phase component data.

A control signal generator 56 inputs control data DPCCH such as a pilot PILO, TFCI and TPC to the modulator 55 as quadrature-component data at a fixed symbol rate. Spreaders 55a, 55b subject the transport data DPDCH (I-channel component) and control data DPCCH (Q-channel component) to spread-spectrum modulation using a predetermined spreading code, multipliers 55c, 55d multiply the spread data by gain factors βd, βc, which have been calculated by a gain-factor calculation unit 57, DA converters 55e, 55f subject the outputs of the multipliers 55c, 55d, respectively, to a DA conversion and input the resultant analog signals to a QPSK quadrature modulator 55g. The latter subjects the I-channel signal and Q-channel signal to QPSK quadrature modulation, and a radio transmitter 58 frequency-converts (IF→RF) the baseband signal from the quadrature modulator 55g to a high-frequency signal, performs high-frequency amplification, etc., and transmits the amplified signal from an antenna $ANT_T$.

At reception, a radio receiver 61 subjects a high-frequency signal received from an antenna $ANT_R$ to a frequency conversion (RF→IF conversion) to obtain a baseband signal, after which a demodulator 62 subjects the baseband signal to quadrature detection to generate an in-phase component (I component) signal and a quadrature component (Q component) signal, applies an analog-to-digital conversion to each of these signals, applies despread processing to the I- and Q-component data using a code identical with that of the spreading code, inputs the user data DPDCH to the channel codec 54 and inputs the control data to a TPC extraction unit 63.

The channel codec 54 demultiplexes the multiplexed encoded data, then applies error correction processing to the encoded data, decodes the original transport data and inputs the data to the TAF IF 53. The latter inputs the entering decoded data to the TAF units 51a to 51n and host application 52 selectively.

The gain-factor calculation unit 57 calculates the gain factors βd, βc in accordance with Equations (1) to (3) and inputs the gain factors to the multipliers 55c, 55d, respectively, of the modulator 55.

Figure 2:
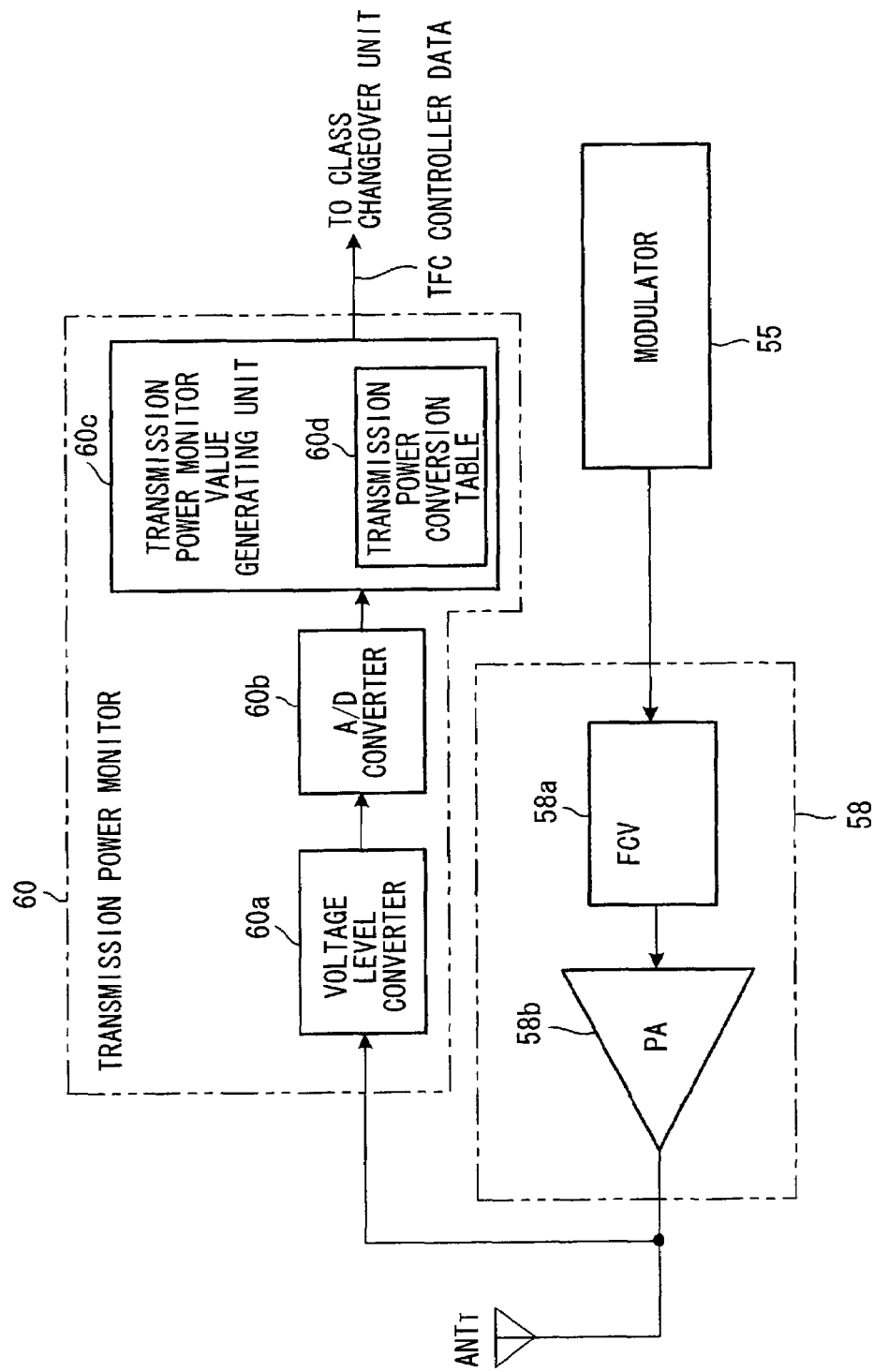
FIG. 2 is a block diagram of a transmission power monitor and peripheral units.

On the basis of the "0" "1" logic of the TPC bit of the downlink, a transmission power controller 59 controls the transmission power in accordance with Equations (7) and (8). A transmission power monitor 60 measures the transmission power and inputs a signal indicative thereto to a class changeover unit 53c in the TAF IF 53. FIG. 2 is a block diagram of the transmission power monitor 60 and units peripheral thereto. The radio transmitter 58 has a frequency converter 58a for up-converting the QPSK modulated signal, which is output from the modulator 55, to a radio frequency, and a transmission power amplifier 58b for amplifying the RF signal and input the amplified signal to the antenna $ANT_T$. The transmission power monitor 60 has a voltage level converter 60a for converting the RF signal output from the frequency converter 58a to a voltage level, and an AD converter 60b for converting the voltage level to a digital signal. The transmission power monitor 60 further includes a transmission power monitor value generating unit 60c which, using a transmission power conversion table 60d stored in an internal ROM, converts the digital signal to a predetermined transmission output monitor value and then calculates the difference between the monitor value and a preset maximum transmission power or the difference between the monitor value and an appropriate transmission power and inputs the difference to the class changeover unit 53c as TFC control data. The transmission power conversion table 60d is realized by previously storing information in the ROM. The information states that when particular data arrives, a certain value is output as the transmission power monitor value. On the basis of the TFC control data that enters from the transmission power monitor 60, the class changeover unit 53c changes the class of TFC to be selected.

Figure 1:
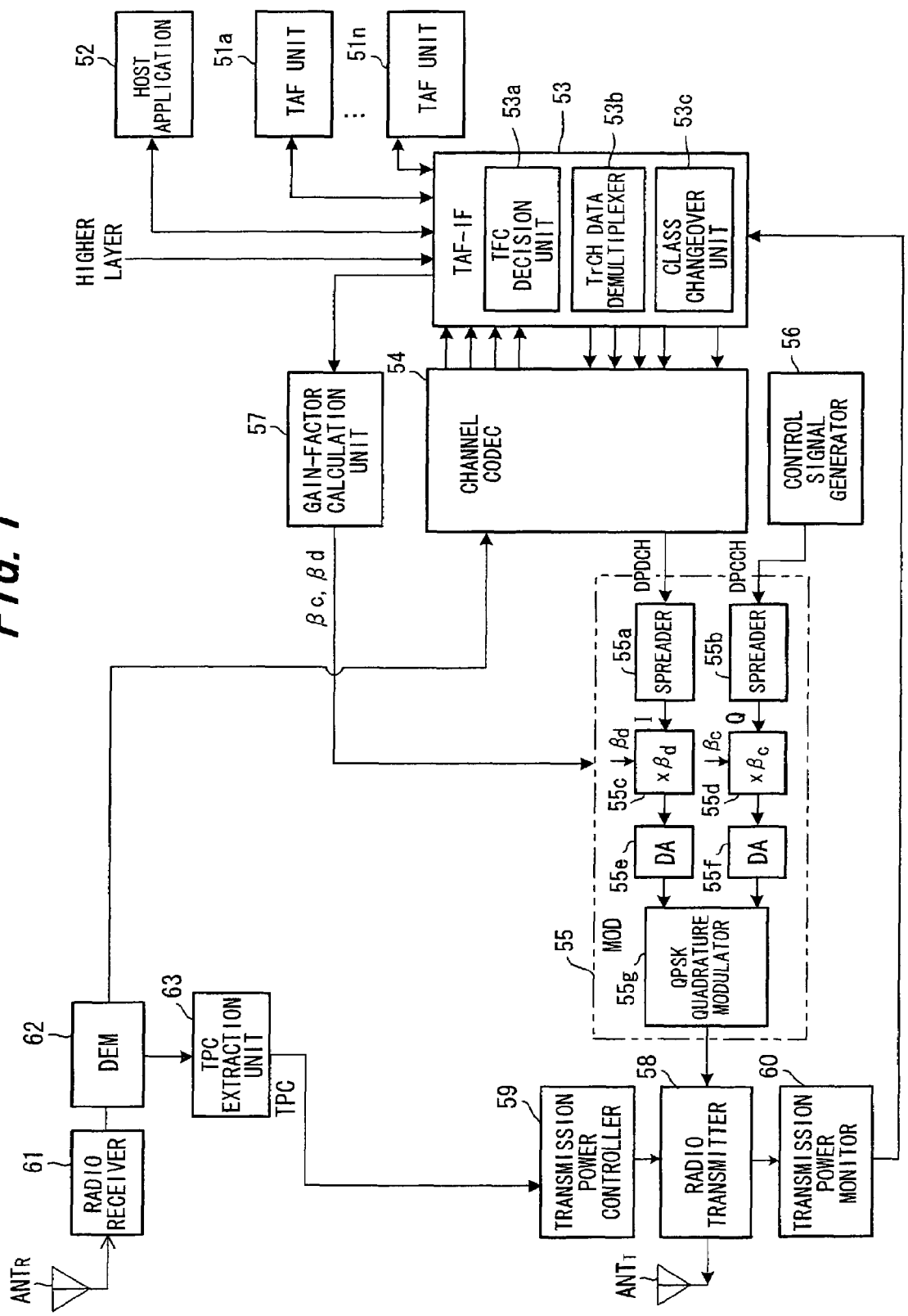
FIG. 1 is a block diagram illustrating the structure of a mobile terminal (mobile station) according to the present invention.
Figure 3:
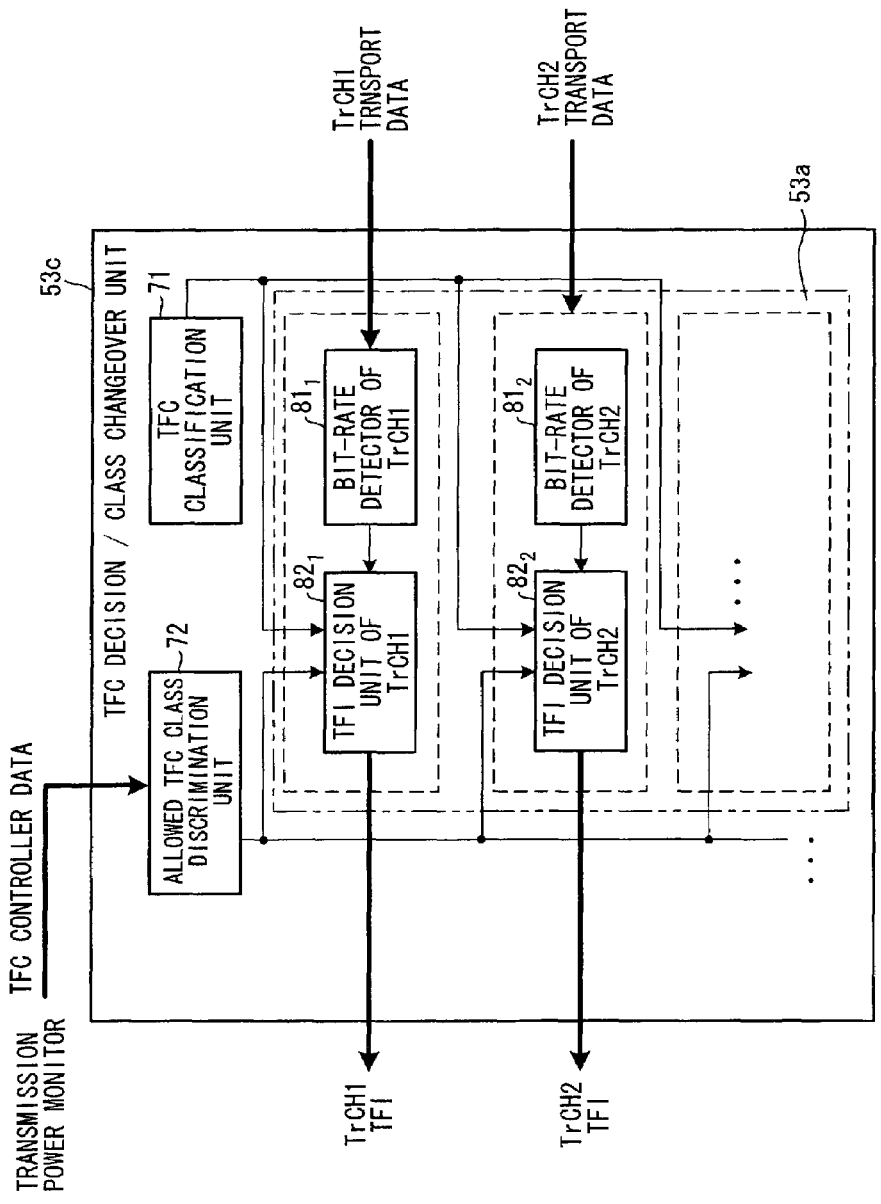
FIG. 3 is a block diagram of a class changeover unit.

FIG. 3 is a diagram illustrating the structure of the class changeover unit 53c, inclusive of the TFC decision unit 53a. A TFC classification unit 71 classifies TFCs, which specify combinations of transport-data bit lengths of the TrCHs (combinations of transport formats), based upon the amount of multiplexed transport data of each TrCH, creates a classification table (see FIG. 4) and stores the table. Based upon the TFC control data (the difference between the monitor value and the preset maximum transmission power or the difference between the monitor value and the appropriate transmission power) that enters from the transmission power monitor 60, an allowed TFC class discrimination unit 72 determines an allowed class of TFCs to be selected. The TFC decision unit 53a has a bit-rate detector $82_i$ for detecting the bit rate on a respective TrCHi (i=1, 2, ... ), and a TFI decision unit $82_i$ for deciding transport data length (transport format) every TTI of a respective TrCHi from the bit rate on the respective TrCHi (i=1, 2, ... ) and the allowed TFC class, and for inputting the transport data length to the TrCH data demultiplexer 53b (FIG. 1). On the basis of the changed TFC, the TrCH data demultiplexer 53b recognizes the transport data length every transmission time interval TTI of each TrCH, demultiplexes the transport data of each TrCH every transmission time interval TTI based upon the transport data length, and inputs the data to the channel codec 54.

(B) Classifying of TFCs

A TFC class is the result of classifying a TFC based upon amount of multiplexed transport data after rate matching of each TFC. For example, consider a case where a TrCH has generated two channels of user data. Assume that transport format TFIs capable of being selected on transport channels TrCH1, TrCH2 are as follows:

TrCH1 selectable transport format TFIs (nine types):
336 bits×0, 336 bits×1, 336 bits×2, 336 bits×4, 336 bits×8, 336 bits×12, 336 bits×16, 336 bits×20, 336 bits×24; and TrCH2 selectable transport format TFIs (two types)
148 bits×0, 148 bits×1.

Figures 4, 5:
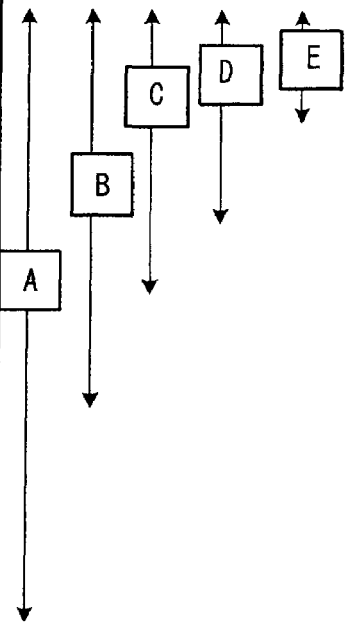
FIG. 4 illustrates an example of transport formats (an example of a classification table)
FIG. 5 illustrates the correlation between transport slot numbers and transport-data bit lengths pr frame.

Further, assume that the rate matching ratios of TrCH1 and TrCH2 are as follows:
TrCH1: RM=145
TrCH1: RM=160 and that the transmission time interval TTIs of TrCH1 and TrCH2 are as follows:
TrCH1: TTI=20 ms
TrCH2: TTI=40 ms There are 18 (9×2) combinations of TTIs of TrCH1, TrCH2. If a rate-matching calculation is performed with regard to each combination (TFCj, j=1 to 18) of TTIs by a procedure described below, the combined data bit lengths of TrCH1, TrCH2 after rate matching and the transport-slot format numbers become as shown in FIG. 4. Here the slot format number indicates the uplink transport-data bit length per frame defined according to 3GPP. The transport slot numbers and transport-data bit lengths per frame are correlated as shown in FIG. 5. The 18 transport format combinations TFCj (j=1 to 18) are classified based upon data length after rate matching and uplink transport-data bit length per frame defined according to 3GPP.

More specifically, in the classification table of FIG. 4, let Class A represent a class capable of transmitting the largest amount of user data, let Class B represent the next class, let Class C represent the next class, and so on. The TFCs allowed in Class A are Nos. 1 to 18, and transport-slot format numbers that can be used are 2 to 6. Further, TFCs allowed in Class B are Nos. 1 to 12, and transport-slot format numbers that can be used are 2 to 5. The TFCs allowed in Class C are Nos. 1 to 9, and transport-slot format numbers that can be used are 2 to 4. This classification is implemented by categorizing every mobile station and limiting the transport format (TFI) of each TrCH, which is specified by the higher layer, in accordance with the transmission capability of the mobile station.

The rate-matching calculation is performed as set forth below.

A transport-slot formats is defined according to 3GPP as shown in FIG. 5. A subset SET0

SET0: {150, 300, 600, 1200, 2400, 4800, 9600)

is defined from this transport-slot format. Next, a subset SET1 is calculated in accordance with the following equation:

$$\{Ndata_{SET0} - \Sigma i [Rmi/minRM] \times Nji\} \quad (12)$$

where $Ndata_{SET0}$ represents each factor of the subset SET0, i the TrCH number, Rmi the rate matching ratio of each TrCHi specified by the higher layer, (minRM is the minimum rate matching ratio in the RMi (i=1, 2, ...), and Nji the data bit length prior to rate matching of each TrCHi of a jth TFC (=TFCj). The subset SET1 is a subset in which the factors are seven values obtained by performing the operation of Equation (12) with regard to each of $Ndata_{SET0}$=150, 300, 600, 1200, 2400, 4800, 9600.

Next, if the smallest factor is found among factors in the subset SET1 that are greater than zero, $Ndata_{SET0}$ conforming to this factor will be the data bit length Ndata after rate matching.

This data bit length Ndata after rate matching becomes any one of the seven bit lengths per frame in FIG. 5 and therefore the class of a jth TFC (=TFCj) can be decided from the bit length. If classes of other TFC are decided in similar fashion, the classification table of FIG. 4 is obtained.

Figure 6:
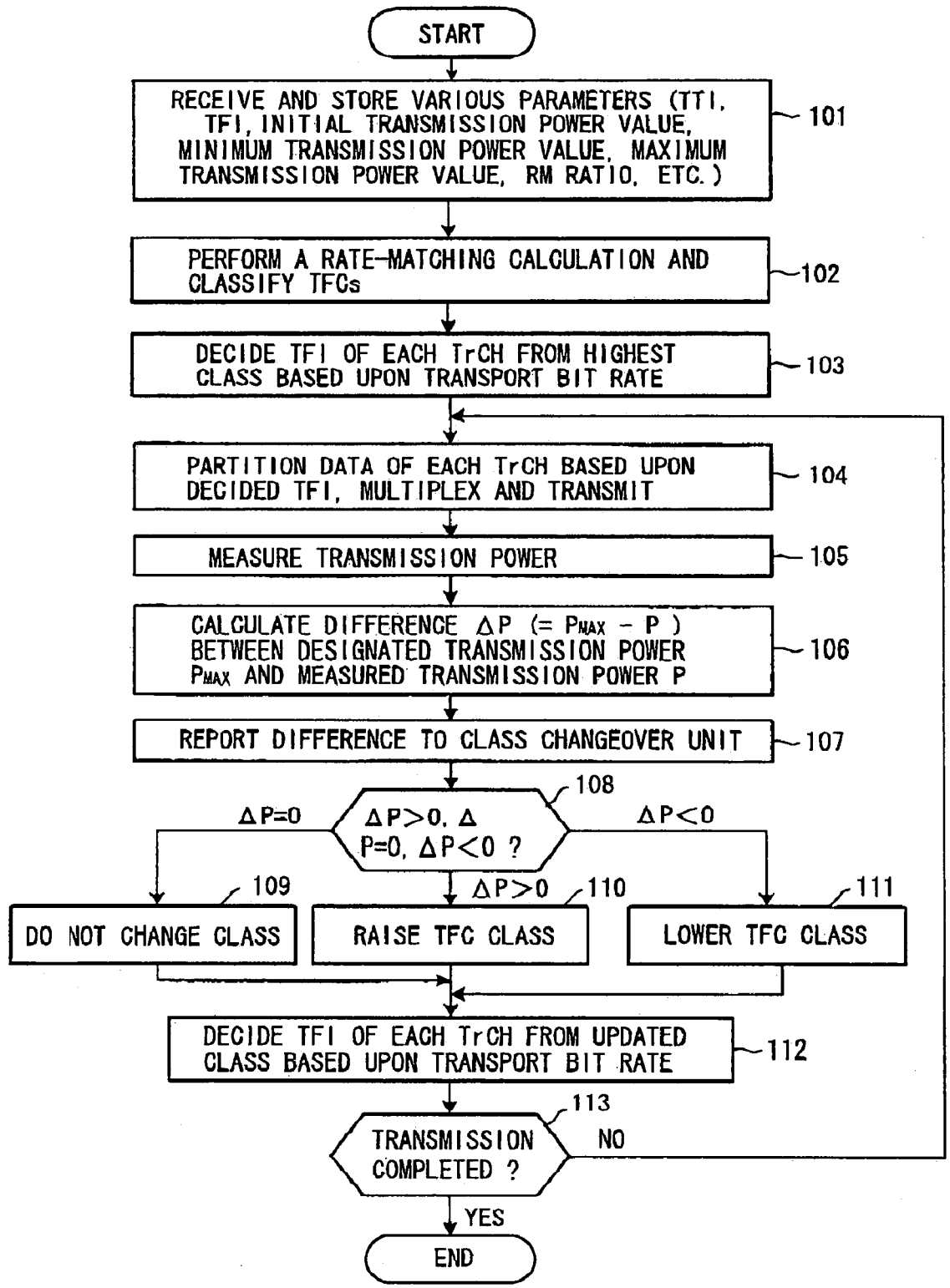
FIG. 6 is a flowchart of processing for TFC selection based upon transmission power according to a first embodiment of the present invention.

(C) Processing for TFC Selection Based Upon Transmission Power According to a First Embodiment FIG. 6 is a flowchart of processing for TFC selection based upon transmission power according to a first embodiment of the present invention. The first embodiment is an example in which, when a class changeover is made, the transmission power monitor 60 notifies the class changeover unit 53*c* of the difference between transmission power and designated maximum transmission power or the size relationship between transmission power and designated maximum transmission power, and the class changeover unit 53*c* raises or lowers the allowed TFC class using the TFC control data and selects a TFC from the class.

Since transmission power increases when bit length per transport frame increases, in such case control for lowering the allowed TFC class is performed. Conversely, in a situation where transmission power approaches the minimum transmission power, control for raising the allowed TFC class is carried out.

The TAF IF 53 of the mobile station receives and stores various parameters (TTI, TFI table, rate matching ratio, etc.) reported by the higher layer (step 101). Next, the TAF IF 53 classifies each TFC (step 102). That is, the TAF IF 53 performs the rate-matching calculation in accordance with Equation (12) with regard to a jth TFC (=TFCj, j=1 to 18), which is a combination of transport formats (TFI) of each TrCHi, to decide the class to which it belongs, performs the rate-matching calculation with regard to other TFCs in similar fashion to decide the classes to which they belong, creates the classification table of FIG. 4 and stores the table.

When classifying ends, the TAF IF 53 decides the transport format (TFI) of each TrCHi from the highest class based upon the transport bit rate of each TrCIi (step 103), partitions the data of each TrCHi based upon the transport format (TFI) decided, and transmits the data by multiplexing (step 104).

The transmission power monitor 60 measures the transmission power (step 105), calculates the difference ΔP (=$P_{MAX}$-Pt) between the transmission power Pt and designated maximum transmission power $P_{MAX}$ (step 106), and reports the result of calculation to the class changeover unit 53*c* as TFC control data (step 107).

The class changeover unit 53*c* discriminates the sign of the difference ΔP (step 108), does not change the TFC class if ΔP=0 holds (step 109), raises the TFC class by one rank if ΔP>0 holds (step 110), and lowers the TFC class by one rank if ΔP<0 holds (step 111). Next, the TFC decision unit 53*a* decides the transport format (TFI) of each TrCHi from the updated class based upon the transport bit rate of each TrCHi and inputs the TFI to the TrCH data demultiplexer 53*b* (step 112). The TrCH data demultiplexer 53*b* demultiplexes the transport data of each TrCH every TTI based upon the transport format (TFI) decided, and inputs the data to the channel codec 54. The latter encodes the transport data of each TrCH on a per-TTI basis and then multiplexes and transmits the data.

Monitoring is then performed to determine whether transmission has been completed (step 113). The processing from step 104 onward is repeated until transmission is completed.

More specifically, if the designated transmission power $P_{MAX}$ is set x dB lower than the maximum transmission power value range.max in the transmission power monitor 60 and the transmission power Pt of the actual transmission satisfies the following relation:

range.max≧Pt>range.max−x dB then, in a case where the present TFC was of Class A in the classification table of FIG. 4, a limitation is placed on the TFC in such a manner that class is lowered one rank to Class B. Conversely, if the transmission power Pt of the actual transmission satisfies the following relation:

range.max−x dB>Pt then, in a case where the present TFC was of Class B in the classification table of FIG. 4, the TFC limitation is removed so as to raise the class to Class A.

It is stated above that the difference ΔP between the transmission power Pt and designated transmission power $P_{MAX}$ is fed back to the class changeover unit 53*c*. However, it can be so arranged that the size relationship between the transmission power Pt and designated transmission power $P_{MAX}$ is fed back to the class changeover unit 53*c*. That is, the designated transmission power $P_{MAX}$ is predetermined in the transmission power monitor 60. If the power of the actual transmission is greater than the designated transmission power $P_{MAX}$, the transmission power monitor 60 reports this to the class changeover unit 53*c*, the latter exercises control that lowers the TFC class by one rank based upon this information and, as a result, limits transmission power.

Conversely, if the power of the actual transmission is less than the designated transmission power $P_{MAX}$, the class changeover unit 53c exercises control that raises the TFC class by one rank and increases transmission power.

Thus, it is so arranged that TFCs are classified based upon the amount of multiplexed transport data and a TFC is selected from the class one rank lower than the present class if transmission power with the present class is greater than the designated transmission power. As a result, since the difference in amount of transport data between classes is large, transmission power can be kept below the designated maximum transmission power by a single control operation. This means that a TFC can be decided at high speed. Further, if the transmission power exceeds the designated maximum transmission power, the TFC must be selected from the class that is one rank lower. This means that a TFC that results in maximum transmission power is not allowed to be selected even in the case of a mobile station having a high transmission capability.

Further, classification is carried out by performing a rate-matching calculation, obtaining data bit length after rate matching, and classifying a TFC based upon the data bit length after rate matching. As a result, a TFC can be decided taking into consideration the amount of data increase or decrease due to rate matching. Further, data bit length after rate matching can be decided so as to become any transport-data bit length of a plurality of stages (150, 300, 600, 1200, 2400, 4800, 9600 bps) per frame stipulated by a 3GPP-compliant transport slot format.

(D) Processing for TFC Selection Based Upon Transmission Power According to a Second Embodiment This second embodiment is an example in which the class of a TFC to be selected is calculated based upon the difference between an appropriate transmission power value and a measured transmission power value. Selection of a prescribed TFC is performed upon deciding TFC class dynamically by calculation.

By way of example, in the classification table of FIG. 4, the relationship among the maximum data bit lengths per frame in Classes A, B, C, D and E is such that the maximum data bits lengths are successively halved. Consider a boundary of 3 dB with regard to an appropriate transmission power Pg utilizing the fact that transmission power increases incrementally by 3 dB whenever the data bit length per transport frame doubles.

More specifically, let Pg represent the appropriate transmission power value. The appropriate transmission power value Pg is decided in such a manner that the following relationship will hold with respect to the maximum transmission power value range.max:

$$Pg = \text{range.max} - y(dB) \quad (y=0, 3, 6, 12, 24 \ldots) \quad (13)$$

Further, the range of transmission power Pt in an actual transmission is specified by the following equation:

$$\text{range.max} - y'(dB) \geq Pt > \text{range.max} - y''(dB) \quad (14)$$

where boundaries y', y" are whole-number multiples of 3 dB (=Pw). The relationship between y' and y" is as follows: when y' is 0, 3, 6, 12, . . . , y" is 3, 6, 12, 24, . . .

The difference $\Delta$dB between the power Pt of the actually transmitted signal and the appropriate transmission power Pg is as follows:

$$\Delta = y' - y(dB) \quad (15)$$

Accordingly, the z that satisfies the following equation:

$$10 \log z = \Delta \quad (16)$$

is found, the class for which the transport-frame bit length is z times the transport-frame bit length currently being transmitted is obtained, and the TFC selection is made from this class. For example, if the transmission power Pt of the signal actually transmitted falls within the range defined by range.max$\geq$Pt>range.max$-3$ dB with the appropriate transmission power value Pg satisfying the relation Pg=range.max$-3$ dB, then we have $\Delta=0-3=-3$ dB and z=1/2. Therefore, if the class of the present TFC is A in the classification table of FIG. 4, the present maximum transport-frame bit length is 9600. Accordingly, a limit is placed upon TFC by lowering the class one rank to Class B, for which the maximum transport-frame bit length is 9600×(1/2)=4800.

Further, if the transmission power Pt of the signal actually transmitted falls within the range defined by range.max$-6$ dB$\geq$Pt>range.max$-12$ dB with the appropriate transmission power value Pg satisfying the relation Pg=range.max$-3$ dB, then we have $\Delta=6-3=3$ dB and z=2. Therefore, if the class of the present TFC is B in the classification table of FIG. 4, the present maximum transport-frame bit length is 4800. Accordingly, the TFC selection is made by raising the class one rank to Class A, for which the maximum transport-frame bit length is 4800×2=9600.

Figure 7:
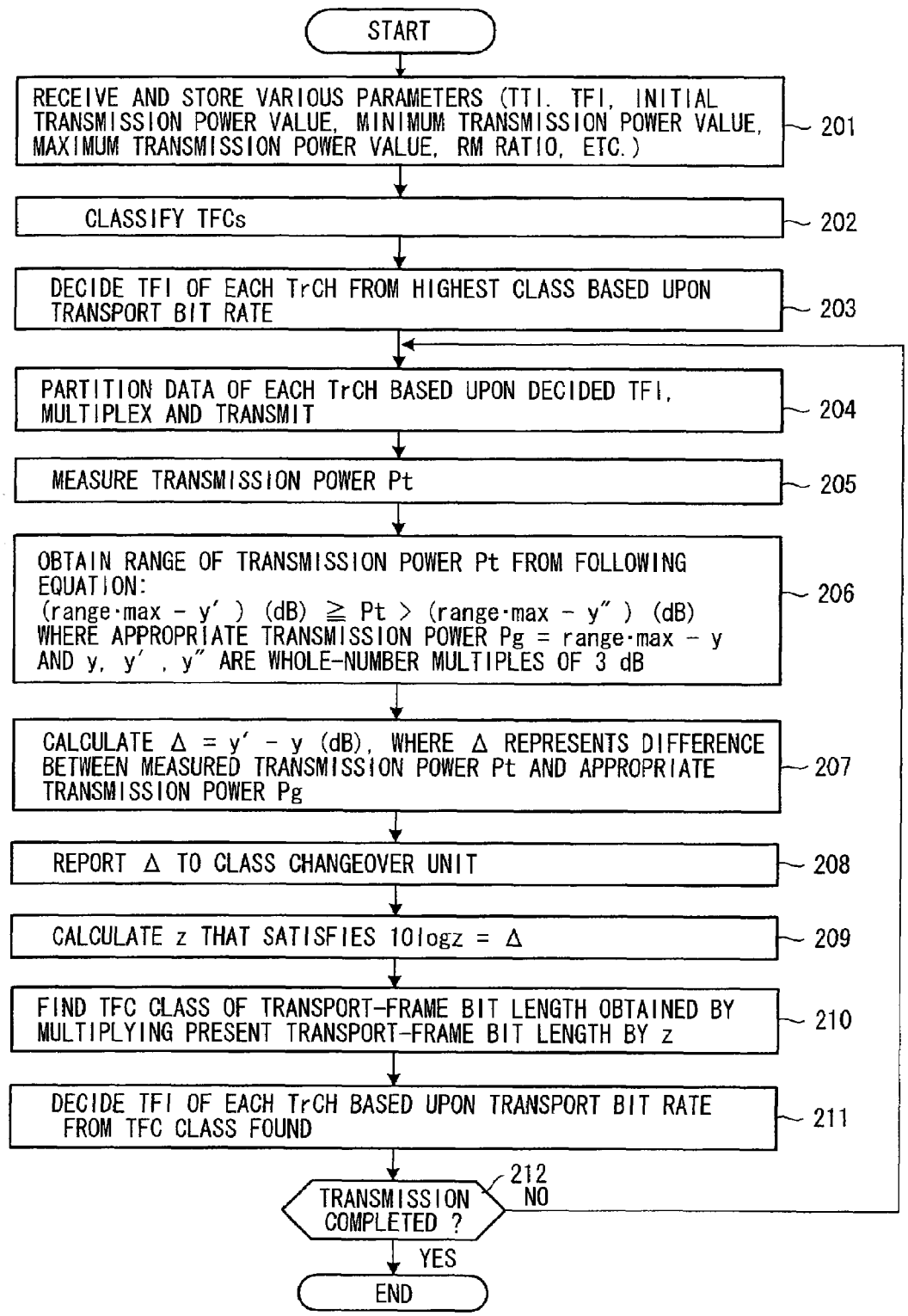
FIG. 7 is a flowchart of processing for TFC selection based upon transmission power according to a second embodiment of the present invention.

FIG. 7 is a flowchart of processing for TFC selection based upon transmission power according to the second embodiment of the present invention.

The TAF IF 53 of the mobile station receives and stores various parameters (TTI, TFI table, rate matching ratio, etc.) reported by the higher layer (step 201). Next, the TAF IF 53 classifies each TFC (step 202). That is, the TAF IF 53 performs the rate-matching calculation in accordance with Equation (12) with regard to a jth TFC (=TFCj, j=1 to 18), which is a combination of transport formats (TFI) of each TrCHi, to decide the class to which it belongs, performs the rate-matching calculation with regard to other TFCs in similar fashion to decide the classes to which they belong, creates the classification table of FIG. 4 and stores the table.

When classifying ends, the TAF IF 53 decides the transport format (TFI) of each TrCHi from the highest class based upon the transport bit rate of each TrCIi (step 203), partitions the data of each TrCHi based upon the transport format (TFI) decided, and transmits the data by multiplexing (step 204).

The transmission power monitor 60 measures the transmission power Pt (step 205), decides the range of the transmission power Pt in accordance with Equation (14) (step 206), calculates the difference $\Delta$ between the appropriate transmission power value Pg and the transmission power Pt in accordance with Equation (15) (step 207), and reports $\Delta T$ to the class changeover unit 53c as the TFC control data (step 208).

The class changeover unit 53c calculates z based upon Equation (16) (step 209), finds the TFC class of the transport-frame bit length obtained by multiplying the present transport-frame bit length by z, and adopts this class as the allowed TFC class (step 210).

Next, the TFC decision unit 53a decides the TFC from the allowed TFC class based upon the transport bit rate of each transport format (TrCHi) and inputs the TFI to the TrCH data demultiplexer 53b (step 211). The TrCH data demultiplexer 53b demultiplexes the transport data of each TrCH every TTI based upon the transport format (TFI) decided, and inputs the data to the channel codec 54. The latter encodes the transport data of each TrCH on a per-TTI basis and then multiplexes and transmits the data.

Monitoring is then performed to determine whether transmission has been completed (step 212). The processing from step 204 onward is repeated until transmission is completed.

The second embodiment can be summarized as follows: ① The appropriate transmission power Pg is specified by the difference between Pg and the maximum transmission power range.max, and the transmission-power range is divided into a plurality of intervals. ② Boundaries of this transmission-power range are specified by differences y', y" relative to the maximum transmission power and the differences y, y', y" are made whole-number multiples of a predetermined power step Pw (=3 dB). ③ When a power range to which the measured transmission power value Pt belongs is specified by y', y", the difference Δ between the appropriate transmission power value Pg and the measured transmission power Pt is made (y'-y). ④ A multiplexed transport data quantity z for which the transmission power becomes the appropriate transmission power value is calculated from the difference (y'-y), and the class of the TFC to be selected is calculated based upon this multiplexed transport data quantity.

Thus, the second embodiment is such that when the TFC class is decided, the transmission power value is measured and the class of the TFC to be selected is calculated based upon the difference between the appropriate transmission power value and the measured transmission power value. As a result, the transmission power can be made to approach the appropriate transmission power reliably by a single TFC-class changeover control operation. This makes it possible to decide the TFC at high speed.

(E) Processing for Changing Designated Maximum Transmission Power/Appropriate Transmission Power According to a Third Embodiment This third embodiment is an example so adapted that the designated maximum transmission power $P_{MAX}$ of the first and second embodiments or appropriate transmission power value Pg can be changed at will from an external unit, e.g., from a base station. The designated maximum transmission power $P_{MAX}$ or appropriate transmission power value Pg is changed based upon communication traffic within a cell.

Figure 8:
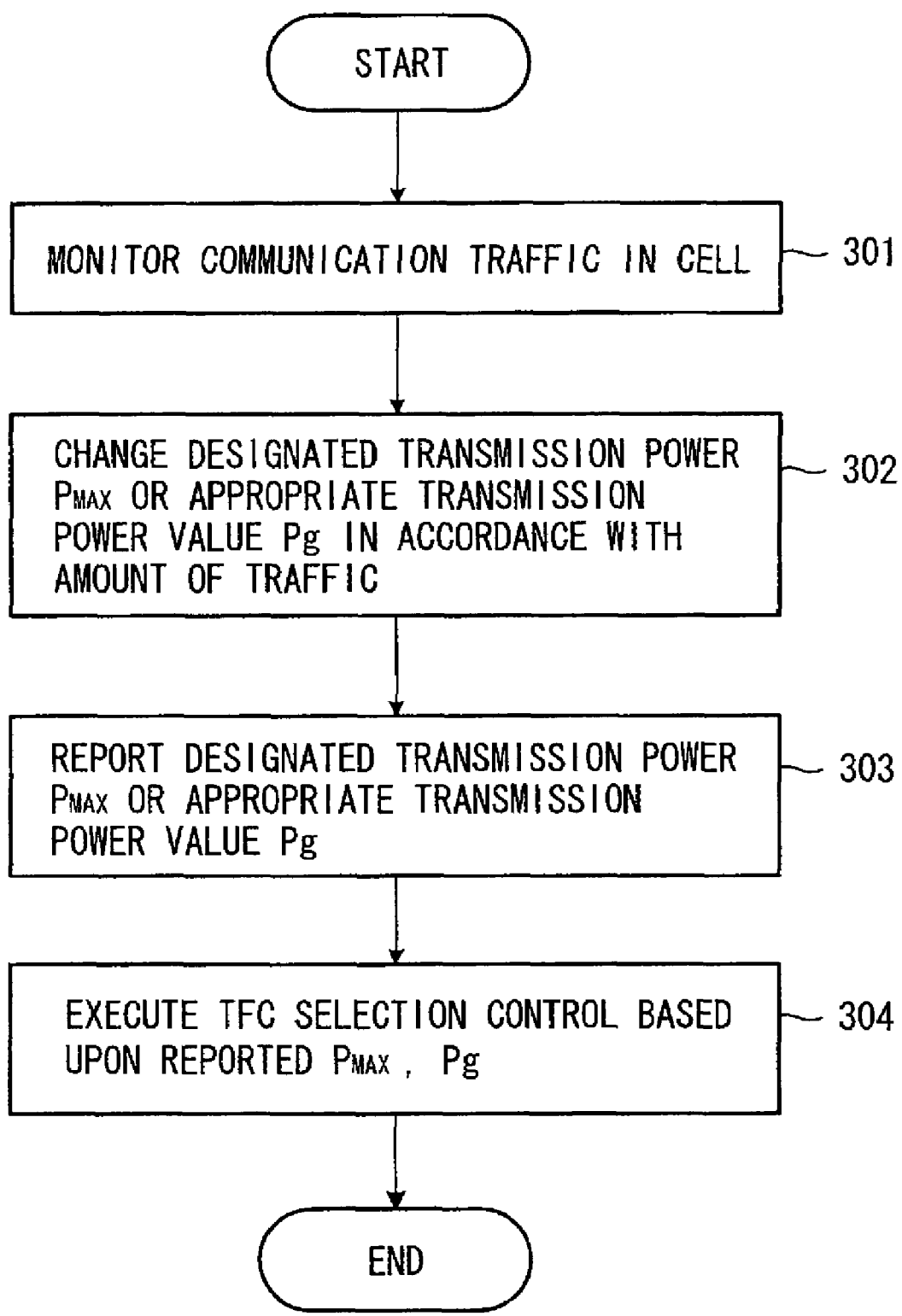
FIG. 8 is a flowchart of processing according a third embodiment.

FIG. 8 is a flowchart of processing according a third embodiment. The base station monitors communication traffic within the cell (step 301). If the amount of traffic is heavy, the base station changes the designated transmission power $P_{MAX}$ or appropriate transmission power value Pg to a smaller value (step 302) for the purpose of suppressing the transmission power of the mobile stations within the cell. The base station reports $P_{MAX}$ or Pg to each mobile station within the cell by downlink notification information (step 303). Each mobile station acquires $P_{MAX}$ or Pg within the notification information, uses this value to create TFC control data and performs the TFC selection based upon the transmission power (step 304).

Conversely, if the communication traffic is light and it is judged that the transmission power of each mobile station in the cell may be raised, the base station changes the value of $P_{MAX}$ or Pg to a larger value (step 302) and reports this value to each of mobile stations by the notification information (step 303).

Thus, the third embodiment is such that if the amount of traffic is heavy, transmission power is lowered so that more traffic can be handled. If the amount of traffic declines, then transmission power may be raised to make excellent communication possible.

(F) Control for Changing Boundaries According to a Fourth Embodiment

Figure 9:
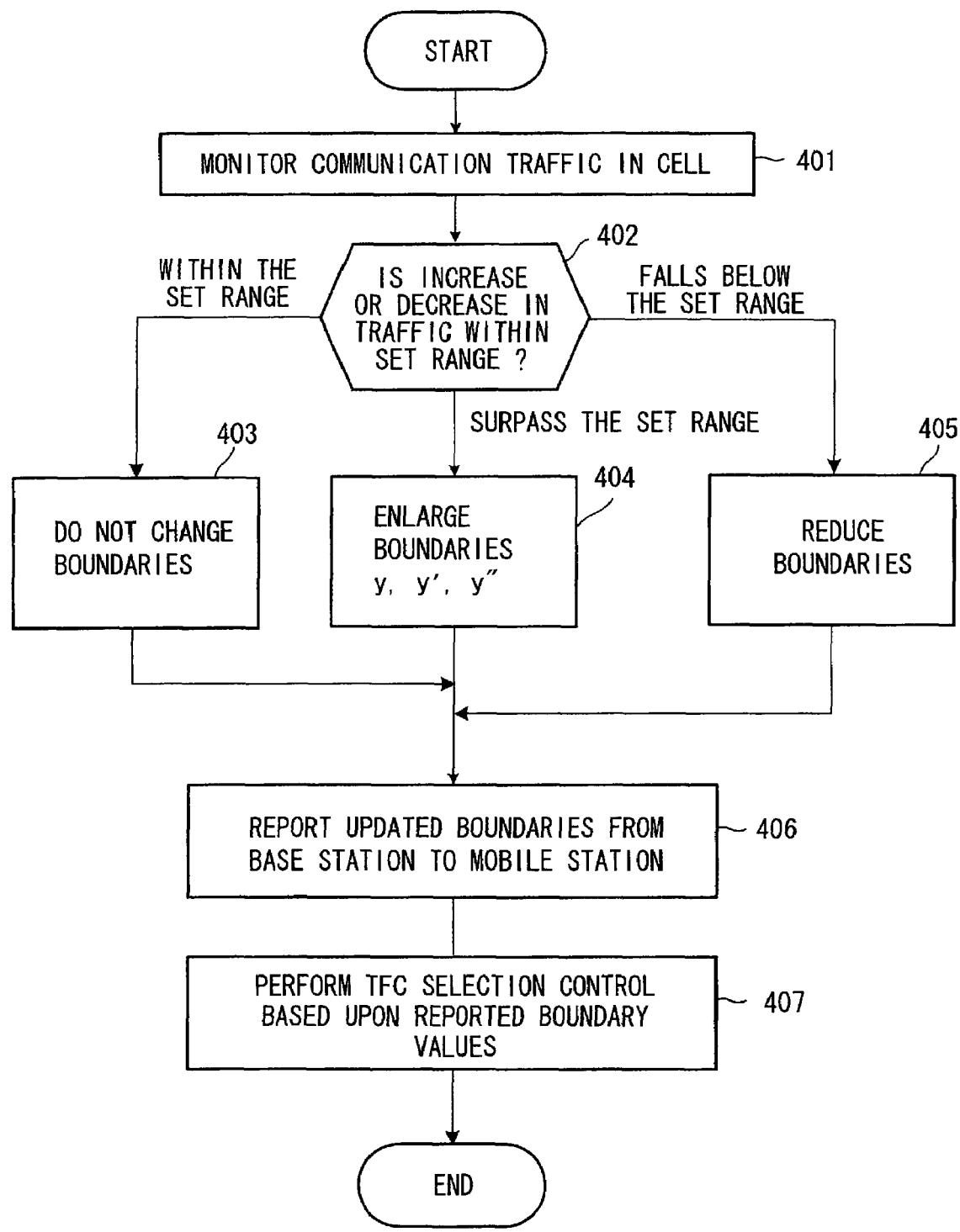
FIG. 9 is a flowchart of processing according a fourth embodiment.

This fourth embodiment is an example in which the base station controls the boundaries y, y', y" of the second embodiment based upon an amount of increase or decrease in communication traffic within a cell. FIG. 9 is a flowchart of processing according the fourth embodiment.

The base station monitors communication traffic within the cell (step 401) and checks to determine whether an increase or decrease in amount of traffic resides within a set range (step 402). If the increase or decrease is within the set range, the base station does not change boundaries (step 403). If the increase or decrease surpasses the set range, the base station enlarges the values of y, y', y", which are boundaries of the appropriate transmission power relative to the maximum transmission power (step 404). If the increase or decrease falls below the set range, the base station reduces the values of y, y', y" (step 405). It should be noted that the values of y, y', y" can be realized by changing the power step Pw described in the second embodiment.

The base station reports the changed boundary values, namely the power step Pw, to each mobile station within the cell by means of downlink notification information (step 406). Each mobile station acquires the power step Pw in the notification information, creates TFC control data using this value, and makes the TFC selection based upon transmission power (step 407).

By way of example, the power step Pw that specifies the boundaries y, y', y" in the second embodiment is 3 dB. However, if Pw is made 6 dB owing to the amount of increase or decrease in traffic, the class changeover can be made from Class A to Class C or from Class C to Class A, i.e., the class can be raised or lowered by two ranks, through a single control operation. Even if the amount of increase or decrease in traffic is large, therefore, transmission power can be made less than the designated maximum transmission power or can be made to approach the appropriate transmission power through a single control operation.

Another example of a method of changing appropriate transmission power or boundaries from the base station is to store the above-mentioned parameters in a non-volatile memory or the like within the mobile station beforehand, read these values out of the memory and report them to the related section of the mobile station when the mobile station is activated.

(G) Another Embodiment of Classification Method

In classification processing already described, the rate-matching calculation is performed using the transport format information (a TFI table) of each TrCH specified by the higher layer in advance, the transmission time interval TTI and the RM ratio, and the classification is made based upon data bit length after rate matching obtained by the rate-matching calculation. However, this entails much calculation processing and it takes time to create the classification table (FIG. 4). Accordingly, proposed below is a technique for creating a classification table in a simple manner. Specifically, data bit length after rate matching is simply estimated and the classification is made based upon the result.

Figure 10A:
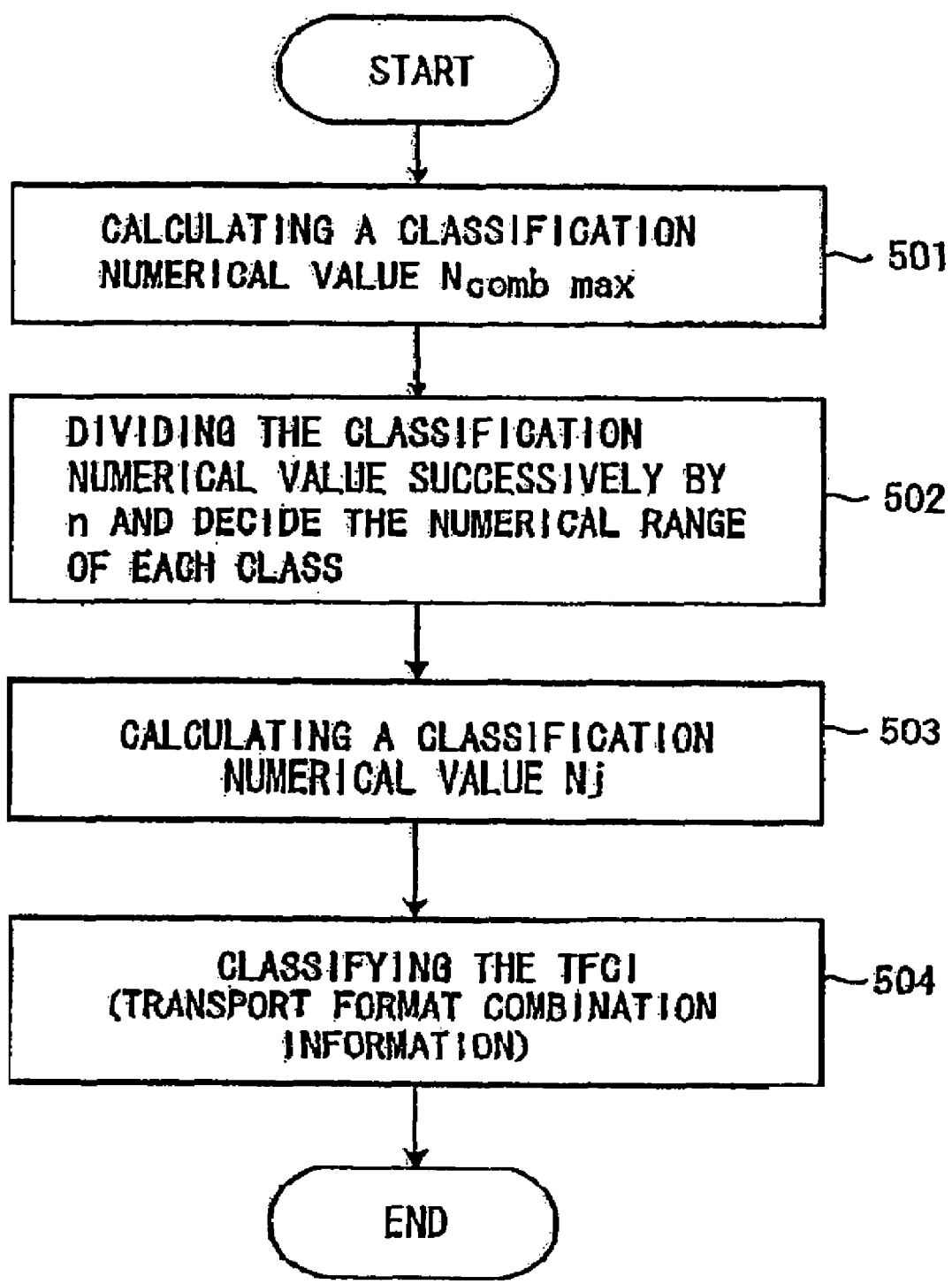
FIG. 10A is a flowchart of processing for creating a classification table in a simple manner.

FIG. 10A is a flowchart of processing for creating a classification table in a simple manner.

First, reference is made to a transport format information (TFI table) that specifies transport-data bit lengths (represented by block length and number of blocks) of prescribed transmission time intervals TTI of each transport channel TrCHi, and a classification numerical value $N_{comb\ max}$ is calculated in accordance with the following equation:

$$N_{comb\ max} = \sum_i \{[(tbn_i\max \times tbs_i\max)/tti_i] \times RMi\} \quad (17)$$

using maximum block length $tbn_i$max and maximum number $tbs_i$max of blocks of each transport channel TrCHi, the transmission time intervals $tti_i$ of every transport channel TrCHi and a rate matching ratio RMi of each transport channel (step 501).

Next, the classification numerical value Ncomb max is divided successively by n, e.g., by 2, thereby deciding the numerical range of each class (step 502). For example, in a case where the boundary of a TFC class is made ½, which corresponds to 3 dB, classification is performed as follows:

largest class: Ncomb_max≧Ndata>Ncomb_max/2
next largest class: Ncomb_max/2≧Ndata>Ncomb_max/4
next largest class: Ncomb_max/4≧Ndata>Ncomb_max/8

As shown in FIG. 5, the transport slot formats are classified into seven classes, namely classes of the seven types 0 to 6. A specific example will be described using the parameters explained in Section (B) relating to TFC classification. Here Ncomb max becomes as follows:

Next, classification of TFCj is decided based upon the numerical range in FIG. 10B to which the classification numerical value Nj belongs. Classes are decided with regard to other TFCs in similar fashion (step 504).

$$N_{comb\ max} = \sum_i \{[(tbn_i\max \times tbs_i\max)/tti_i] \times RMi\}$$

As a result, the range of numerical values of each class based upon this simple classification is as shown in FIG. 10B. This classification is carried out when the TrCH parameters are acquired from the higher layer.

This is followed by calculating a classification numerical value Nj in accordance with the following equation:

$$Nj = \Sigma_i\{[(tbn_i \times tbs_i)/tti_i] \times RMi\} \quad (18)$$

using the block length $Tbn_i$ and number $tbs_i$ of blocks of each transport channel TrCHi stipulated by a jth TFC (=TFCj), the transmission time intervals $tti_i$ of every transport channel and a rate matching ratio RMi of each transport channel (step 503).

Next, classification of TFCj is decided based upon the numerical range in FIG. 10B to which the classification numerical value Nj belong. Classes are decided with regard to other TFCs in similar fashion (step 504).

FIG. 11 illustrates an example of a classification table for a case where classification numbers 0, 1, 2, 3, ... have been assigned in order of decreasing class to results of calculating Nj with respect to each TFC in FIG. 4. The classification table shown in FIG. 11 is created when notification of transport format is given by the higher layer.

If the result of transmission based upon the TFC of No. 18 in FIG. 11 is receipt of TFC control data indicating that the transmission power is +3 dB greater than the appropriate transmission power, then the class changeover unit 53c lowers the class by one and selects a TFC from Nos. 11 to 9 in FIG. 11.

FIG. 12 is a table for comparing and investigating classification finalized based upon transport slot format upon performing the rate-matching calculation, and classification finalized in simple fashion by the above-described simple method. The class range relationships based upon the transport slot format and simple method substantially agree.

In accordance with the simple classification method set forth above, the classification can be carried out at high speed through simple calculation. Moreover, it is possible to perform classification equivalent to classification that is in accordance with bit length per frame in 3GPP.

(H) Modification

In the above embodiments, the timing at which TFC control data is fed back to the class changeover unit is not controlled. However, it can be so arranged that this timing is changed.

During transmission processing, the transmission power value is monitored by the transmission power monitor 60, this value is fed back to the class changeover unit 53c and the latter performs class changeover processing to select the TFC. In order to reduce the load of processing for selecting the transport TFC at this time, the timing of feedback per unit time is reduced. For example, the amount of communication traffic fluctuates when there is a change from one cell to another. If traveling speed from one cell to another is high, therefore, the number of times feedback is performed per unit time is made a large as possible. Conversely, if traveling speed from one cell to another is low, the number of times feedback is performed per unit time is reduced to lighten the load.

Thus, in accordance with the present invention, TFCs are classified based upon amount of data multiplexed and transmitted, and it is so arranged that if transmission power exceeds the designated maximum transmission power with the present class, then a TFC is selected from the next class. Since the difference in amount of transport data between classes is large, therefore, transmission power can be kept below the designated maximum transmission power by a single control operation. In accordance with the present invention, therefore, a prescribed TFC can be decided at high speed.

Further, the present invention is such that if the transmission power exceeds the designated maximum transmission power, the TFC must be selected from the next class for which the amount of transport data is, e.g., half the present class. As a result, a TFC is not allowed to be used to the limit even in the case of a mobile station having a high transmission capability.

Further, according to the present invention, it is so arranged that the TFC class is decided by measuring the transmission power value and calculating the class of the TFC to be selected based upon the difference between an appropriate transmission power value and the measured transmission power value. As a result, the transmission power can be held below the designated maximum transmission power in reliable fashion by a single TFC-class changeover control operation. This makes it possible to decide the TFC at high speed.

Further, according to the present invention, a rate-matching calculation is performed using transport-data bit length of each transport channel stipulated by a TFC and a rate matching ratio of each transport channel, data bit length after rate matching is obtained and a TFC is classified based upon the data bit length after rate matching. If this arrangement is adopted, a TFC can be decided taking into consideration the amount of data increase or decrease due to rate matching.

Further, according to the present invention, data bit length after rate matching can be decided so as to become any transport-data bit length of a plurality of stages (150, 300, 600, 1200, 2400, 4800, 9600 bps) per frame stipulated by a 3GPP-compliant transport slot format. As a result, TFCs can be classified in simple fashion in accordance with bit length per frame in 3GPP.

Further, according to the present invention, a classification numerical value $N_{comb\ max}$ is calculated using maximum block length and maximum number of blocks of each transport channel obtained by referring to a TFI, the transmission time intervals TTI of every transport channel and a rate matching ratio of each transport channel. The classification numerical value $N_{comb\ max}$ is divided successively by n, e.g., by 2, thereby deciding the numerical range of each class. A classification numerical value N of each TFC is calculated in similar fashion, the TFC is classified based upon the numerical range to which the classification numerical value N belongs, and classification is performed similarly for other TFCs as well. As a result, the classification can be carried out at high speed through simple calculation. Moreover, it is possible to perform classification equivalent to classification that is in accordance with bit length per frame in 3GPP.

As many apparently widely different embodiments of the present invention can be made without departing from the spirit and scope thereof, it is to be understood that the invention is not limited to the specific embodiments thereof except as defined in the appended claims.

What is claimed is:

1. A method of selecting transport format combination information in a communication apparatus for selecting prescribed transport format combination information from a plurality of items of transport format formation combination information TFCj (j=1, 2, ... ) that stipulates a combination of transmission format indicators (TFIs) each of which specifies transport data bit length of a prescribed transmission time interval (TTI) of a transport channel, multiplexing transport data of each of the transport channels based upon the transport format combination information that has been selected, and transmitting this data, said method comprising the steps of:

classifying each transport format combination information TFCj (j=1, 2, ... ) to plural classes based upon amount of multiplexed transport data of each transport channel;

measuring a transmission power of the communication apparatus;

deciding a class of transport format combination information to be selected, so that said transmission power of the communication apparatus does not become larger than a designated maximum transmission power; and selecting transport format combination information from the class that has been decided, based upon an actual transport bit rate of each transport channel.

2. The method according to claim 1, wherein the classifying step includes the steps of:

performing a rate-matching calculation using transport-data bit length of each transport channel stipulated by the transport format combination information and a rate matching ratio of each transport channel, and obtaining data bit length after rate matching; and classifying the transport format combination information based upon the data bit length after rate matching.

3. The method according to claim 2, wherein the rate-matching calculation is performed in such a manner that the data bit length after rate matching will become a transport-data bit length per frame of one of a plurality of stages set in advance.

4. The method according to claim 1, wherein the step of deciding the class of transport format combination information includes the steps of:

measuring the transmission power value; and raising or lowering the class of the transport format combination information to be selected, based upon a size relationship between a designated maximum transmission power value and the measured transmission power value.

5. The method according to claim 4, wherein designated maximum transmission power value is changed based upon communication traffic within a cell serving as a base-station communication area.

6. The method according to claim 1, wherein the step of deciding the class of transport format combination information includes the steps of:

measuring the transmission power value; and calculating the class of transport format combination information to be selected, based upon the difference between an appropriate transmission power value and the measured transmission power value.

7. The method according to claim 6, wherein the appropriate transmission power value is changed based upon communication traffic within a cell serving as a base-station communication area.

8. A method of selecting transport format combination information in a communication apparatus for selecting prescribed transport format combination information from a plurality of items of transport formation combination information that stipulate a combination of transport data bit lengths of prescribed transmission time intervals of transport channels, multiplexing transport data of each of the transport channels based upon the transport format combination information that has been selected, and transmitting this data, said method comprising the steps of:

classifying each transport format combination information based upon amount of multiplexed transport data of each transport channel;

deciding the class of transport format combination information to be selected, based upon a transmission power value; and selecting transport format combination information from the class that has been decided, wherein the classifying step includes the steps of:

calculating a classification numerical value $N_{comb\ max}$ using maximum block length and maximum number of blocks of each transport channel obtained from transport format information that specifies transport-data bit lengths of prescribed transmission time intervals of each of the transport channels, the prescribed transmission time intervals of every transport channel and a rate matching ratio of each transport channel, dividing the classification numerical value Ncomb max successively by n and deciding the numerical range of each class;

calculating a classification numerical value N using block length and number of blocks of each transport channel stipulated by a transport format combination information, the prescribed transmission time intervals of every transport channel and the rate matching ratio of each transport channel; and classifying the transport format combination information based upon the numerical range to which the classification numerical value N belongs.

9. A method of selecting transport format combination information in a communication apparatus for selecting prescribed transport format combination information from a plurality of items of transport formation combination information that stipulate a combination of transport data bit lengths of prescribed transmission time intervals of transport channels, multiplexing transport data of each of the transport channels based upon the transport format combination information that has been selected, and transmitting this data, said method comprising the steps of:

classifying each transport format combination information based upon amount of multiplexed transport data of each transport channel;

deciding the class of transport format combination information to be selected, based upon a transmission power value; and selecting transport format combination information from the class that has been decided, wherein the step of deciding the class of transport format combination information includes the steps of:

measuring the transmission power value; and calculating the class of transport format combination information to be selected, based upon the difference between an appropriate transmission power value and the measured transmission power value, and wherein when the appropriate transmission power is specified by a difference y relative to a stipulated maximum transmission power, a transmission-power range is divided into a plurality of intervals, boundaries of the transmission-power range are specified by differences y', y" relative to the maximum transmission power, the differences y, y', y" are made whole-number multiples of a predetermined power step and a power range to which a measured transmission power value belongs is specified by y', y", regarding differences between the appropriate transmission power value and the measured transmission power value as (y'−y), (y"−y);

calculating an amount of multiplexed transport data, for which the transmission power becomes the appropriate transmission power value, by reference to the differences (y'−y), (y"−y); and calculating a class of transport format combination information to be selected, based upon this multiplexed transport data quantity.

10. The method according to claim 9, wherein the boundaries of the transmission-power range are changed based upon an amount of increase or decrease in communication traffic within a cell serving as a base-station communication area.

11. A mobile terminal apparatus for selecting prescribed transport format combination information from a plurality of items of transport format formation combination information TFCj (j=1, 2, . . . ) that stipulates a combination of transmission format indicators (TFIs) each of which specifies transport data bit length of a prescribed transmission time interval TTI of a transport channel, multiplexing transport data of each of the transport channels based upon the transport format combination information that has been selected, and transmitting this data, said apparatus comprising:

classifying means for classifying each transport format combination information TFCj (j=1, 2, . . . ) to plural classes based upon amount of multiplexed transport data of each transport channel;

transmission power measurement means for measuring transmission power value of the mobile terminal apparatus;

class deciding means for deciding a class of transport format combination information to be selected, so that the transmission power value measured by said transmission power measurement means does not become larger than a designated maximum transmission power; and means for selecting transport format combination information from the class decided by said class deciding means, based upon an actual a transport bit rate of each transport channel.

12. The apparatus according to claim 11, wherein said classifying means includes:

calculation means for performing a rate-matching calculation using transport-data bit length of each transport channel stipulated by the transport format combination information and a rate matching ratio of each transport channel, and obtaining data bit length after rate matching; and means for classifying the transport format combination information based upon the data bit length after rate matching.

13. The apparatus according to claim 11, wherein said class deciding means includes means for raising or lowering the class of the transport format combination information to be selected, based upon a size relationship between a designated maximum transmission power value and the measured transmission power value.

14. The apparatus according to claim 13, wherein said class deciding means includes means for changing the designated maximum transmission power value when a command to change the designated maximum transmission power is issued.

15. The apparatus according to claim 11, wherein said class deciding means includes means for calculating the class of transport format combination information to be selected, based upon the difference between an appropriate transmission power value and the measured transmission power value.

16. The apparatus according to claim 15, wherein said class deciding means includes means for changing the appropriate transmission power value when a command to change the appropriate transmission power is issued.

17. A mobile terminal apparatus for selecting prescribed transport format combination information from a plurality of items of transport formation combination information that stipulate a combination of transport data bit lengths of prescribed transmission time intervals of transport channels, multiplexing transport data of each of the transport channels based upon the transport format combination information that has been selected, and transmitting this data, said apparatus comprising:

classifying means for classifying each transport format combination information based upon amount of multiplexed transport data of each transport channel;

transmission power measurement means for measuring transmission power value;

class deciding means for deciding the class of transport format combination information to be selected, based upon the transmission power value measured by said transmission power measurement means; and means for selecting transport format combination information from the class decided by said class deciding means, wherein said classifying means includes:

means for calculating a classification numerical value $N_{comb\ max}$ using maximum block length and maximum number of blocks of each transport channel obtained from transport format information that specifies transport-data bit lengths of prescribed transmission time intervals of each of the transport channels, the prescribed transmission time intervals of every transport channel and a rate matching ratio of each transport channel, dividing the classification numerical value Ncomb max successively by n and deciding the numerical range of each class;

means for calculating a classification numerical value N using block length and number of blocks of each transport channel stipulated by a transport format combination information, the prescribed transmission time intervals of every transport channel and the rate matching ratio of each transport channel; and means for classifying the transport format combination information based upon the numerical range to which the classification numerical value N belongs.

18. A mobile terminal apparatus operable to select a combination from candidates of combinations of data lengths of transport channels and to transmit data in accordance with the combination selection, comprising:

a transmission power measurement unit operable to measure transmission power value for a first transmission of transmitting data in accordance with a first combination selected; and a changing unit operable to change the candidates for selection of a second combination to be used for a second transmission based upon the transmission power value for the first transmission measured by the transmission power measuring unit, wherein the second combination is selected from the changed candidates.

19. The apparatus according to claim 18, wherein said changing unit changes the candidates for selection to candidates the overall data length of which is shorter, the higher the transmission power value becomes, for the second combination.

* * * * *